(12) United States Patent
Minami et al.

(10) Patent No.: US 9,683,141 B2
(45) Date of Patent: Jun. 20, 2017

(54) POLYOLEFIN, ADHESIVE COMPOSITION CONTAINING SAME, AND ADHESIVE TAPE USING SAID ADHESIVE COMPOSITION

(71) Applicant: IDEMITSU KOSAN CO., LTD., Chiyoda-ku (JP)

(72) Inventors: Yutaka Minami, Chiba (JP); Kazuhiro Hashima, Chiba (JP); Masami Kanamaru, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/437,647

(22) PCT Filed: Oct. 31, 2013

(86) PCT No.: PCT/JP2013/079640
§ 371 (c)(1),
(2) Date: Apr. 22, 2015

(87) PCT Pub. No.: WO2014/069606
PCT Pub. Date: May 8, 2014

(65) Prior Publication Data
US 2015/0275054 A1    Oct. 1, 2015

(30) Foreign Application Priority Data

Nov. 2, 2012 (JP) .................. 2012-243079

(51) Int. Cl.
| | | |
|---|---|---|
| C09J 123/12 | (2006.01) | |
| C09J 123/20 | (2006.01) | |
| C08F 10/06 | (2006.01) | |
| C09J 123/18 | (2006.01) | |
| C08L 23/12 | (2006.01) | |
| C08L 23/18 | (2006.01) | |
| C08F 10/08 | (2006.01) | |
| C08F 110/06 | (2006.01) | |
| C09J 7/02 | (2006.01) | |
| C08F 4/659 | (2006.01) | |

(52) U.S. Cl.
CPC .......... C09J 123/20 (2013.01); C08F 10/06 (2013.01); C08F 10/08 (2013.01); C08F 110/06 (2013.01); C08L 23/12 (2013.01); C08L 23/18 (2013.01); C09J 7/021 (2013.01); C09J 123/12 (2013.01); C09J 123/18 (2013.01); C08F 4/65908 (2013.01); C08F 4/65912 (2013.01); C09J 2423/00 (2013.01)

(58) Field of Classification Search
CPC ...................................................... C09J 123/12
See application file for complete search history.

(56) References Cited

U.S. PATENT DOCUMENTS

| 2010/0076146 A1* | 3/2010 | Machida ............ C08F 255/00 524/528 |
|---|---|---|
| 2010/0305259 A1* | 12/2010 | Rodriguez ............ C09J 123/10 524/504 |
| 2010/0324242 A1 | 12/2010 | Machida et al. |
| 2012/0202052 A1 | 8/2012 | Iseki et al. |

FOREIGN PATENT DOCUMENTS

| CN | 102627920 A | 8/2012 |
|---|---|---|
| EP | 1 498 432 A1 | 1/2005 |
| EP | 2 578 607 A1 | 4/2013 |
| JP | 6 4729 | 1/1994 |
| JP | 2008 133320 | 6/2008 |
| JP | 2009-57397 A | 3/2009 |
| JP | 2009 138137 | 6/2009 |
| JP | 2011 519989 | 7/2011 |
| JP | 2011 195711 | 10/2011 |
| JP | 2012 177096 | 9/2012 |
| JP | 2012 193295 | 10/2012 |
| WO | 2008 047860 | 4/2008 |
| WO | 2008 066168 | 6/2008 |

OTHER PUBLICATIONS

International Search Report Issued Dec. 24, 2013 in PCT/JP2013/079640 Filed Oct. 31, 2013.
Extended European Search Report issued Jun. 23, 2016 in Patent Application No. 13850081.4.
Combined Office Action and Search Report issued Jun. 3, 2016 in Chinese Patent Application No. 201380057537.5.

* cited by examiner

*Primary Examiner* — Michael Pepitone
(74) *Attorney, Agent, or Firm* — Oblon, McClelland, Maier & Neustadt, L.L.P.

(57) ABSTRACT

Provided are an adhesive composition which has high holding strength and leaves no residual glue by using a polyolefinic polymer, and an adhesive tape using the same. A polyolefin which satisfies the following conditions (a-1), (b1), and (b2):(a-1) the relationship between the limiting viscosity and the stereoregularity is represented by the formula (i): $-20 \times \eta + 56 \leq \text{mmmm} \leq -20 \times \eta + 64$ (wherein $\eta$ represents the limiting viscosity measured in tetralin at 135° C., and mmmm represents the meso pentad fraction (mol %)); (b1) the meso pentad fraction (mmmm) is from 20 to 60 mol %; and (b2) the limiting viscosity [$\eta$] measured in tetralin at 135° C. is from 0.01 to 2.0 dL/g.

11 Claims, No Drawings

POLYOLEFIN, ADHESIVE COMPOSITION CONTAINING SAME, AND ADHESIVE TAPE USING SAID ADHESIVE COMPOSITION

CROSS-REFERENCE TO RELATED APPLICATIONS

The present application is a national stage application of PCT/JP2013/079640 having a filing date of Oct. 31, 2013 and claims priority to Japanese Patent Application 2012-243079 having a filing date of Nov. 2, 2012.

TECHNICAL FIELD

The present invention relates to an adhesive composition containing a polyolefinic polymer and an adhesive tape using the same.

BACKGROUND ART

Protect films or adhesives containing a polyolefinic material as a base material are inexpensive, and therefore have been variously studied in the past. For example, PTL 1 discloses a protect film produced by mixing a liquid polybutene or a polyisobutylene as a tackifier with an ethylenic polymer. Further, PTL 2 discloses an adhesive tape composed of an olefin polymer and an adhesive resin.

CITATION LIST

Patent Literature

PTL 1: JP-B 6-4729
PTL 2: JP-T 2011-519989

SUMMARY OF INVENTION

Technical Problem

However, with respect to a conventional adhesive increased in the adhesive strength, residual glue was left when a base material was peeled off, and therefore, it was difficult to reuse the adhesive tape, and the holding strength of the adhesive was low. Further, when the addition amount of a tackifier or the like was increased for increasing the adhesive strength, the holding strength was lacking, and thus, the balance between the adhesive strength and the holding strength was not sufficient.

An object to be achieved by the present invention is to provide an adhesive composition which has high holding strength and leaves no residual glue by utilizing a polyolefinic polymer, and an adhesive tape using the same.

Solution to Problem

According to the present invention, the following polyolefin, adhesive composition, and adhesive tape are provided.

[1] A polyolefin which satisfies the following conditions (a-1), (b1), and (b2):
(a-1) the relationship between the limiting viscosity and the stereoregularity is represented by formula (i):

$$-20 \times \eta + 56 \leq mmmm \leq -20 \times \eta + 64 \quad \text{formula (i)}$$

(wherein $\eta$ represents the limiting viscosity measured in tetralin at 135° C., and mmmm represents the meso pentad fraction (mol %));

(b1) the meso pentad fraction (mmmm) is from 20 to 60 mol %; and
(b2) the limiting viscosity $[\eta]$ measured in tetralin at 135° C. is from 0.01 to 2.0 dL/g.

[2] The polyolefin according to the above [1], wherein the polyolefin has a melting point of 20° C. or higher and 160° C. or lower, and a $\Delta H$ of 5 J/g or more and 100 J/g or less.

[3] The polyolefin according to the above [1] or [2], which is a propylene homopolymer.

[4] An adhesive composition, containing the polyolefin according to any one of the above [1] to [3], wherein
the storage elastic modulus of the composition at 25° C. obtained from the solid viscoelasticity measurement of the composition is 1 MPa or more and 200 MPa or less, and the storage elastic modulus thereof at 50° C. is 1 MPa or more and 100 MPa or less.

[5] An adhesive composition, containing:
95 to 5% by mass of the polyolefin according to any one of the above [1] to [3]; and
5 to 95% by mass of a polyolefin having a melting point which is lower than 20° C. or is not observed by a differential scanning calorimeter (DSC) and having a $\Delta H$ of less than 5 J/g, wherein
the storage elastic modulus of the composition at 25° C. obtained from the solid viscoelasticity measurement of the composition is 1 MPa or more and 200 MPa or less, and the storage elastic modulus thereof at 50° C. is 1 MPa or more and 100 MPa or less.

[6] The adhesive composition according to the above [4] or [5], further containing a tackifier.

[7] An adhesive tape, wherein the adhesive composition according to any one of the above [4] to [6] is used in an adhesive layer.

Advantageous Effects of Invention

An adhesive composition containing the polyolefin of the present invention and an adhesive tape using the same have high holding strength and leave no residual glue.

DESCRIPTION OF EMBODIMENTS

Polyolefin of the Present Invention (Crystalline Polyolefin)

The polyolefin of the present invention is a polyolefin which satisfies the following conditions (a-1), (b1), and (b2). In the present invention, hereinafter, this polyolefin is also referred to as "crystalline polyolefin of the present invention".

(a-1) The relationship between the limiting viscosity and the stereoregularity is represented by formula (i).

$$-20 \times \eta + 56 \leq mmmm \leq -20 \times \eta + 64 \quad \text{formula (i)}$$

(In the formula, $\eta$ represents the limiting viscosity measured in tetralin at 135° C., and mmmm represents the meso pentad fraction (mol %).)

(b1) The meso pentad fraction (mmmm) is from 20 to 60 mol %.

(b2) The limiting viscosity $[\eta]$ measured in tetralin at 135° C. is from 0.01 to 2.0 dL/g.

Since the polyolefin of the present invention satisfies the following conditions (a-1), (b1), and (b2), when the polyolefin is used in an adhesive composition, separation of an adhesive component or an amorphous component is not caused, and less residual glue is left. Further, the polyolefin of the present invention itself does not have adhesive strength, however, by using an amorphous polyolefin in combination, an adhesive composition having a favorable balance of adhesive strength, residual glue, and holding strength can be provided. Further, even if an amorphous polyolefin is not used in combination, by using a tackifier in combination, an adhesive composition having a favorable balance between holding strength and residual glue can be provided. The "holding strength" in the present invention refers to withstanding strength when a static load is applied to a portion of a tape bonded to an adherend in the longitudinal direction of the tape.

There was no material which can be highly mixed with an amorphous polyolefin among conventional low-crystalline polypropylenes, and due to this, stickiness, deterioration of transparency, and the like were observed. On the other hand, the polyolefin of the present invention is completely compatible also with an amorphous polyolefin by controlling the stereoregularity although it is a crystalline resin. Accordingly, an adhesive composition containing the polyolefin of the present invention can sufficiently prevent residual glue from being left.

(a-1) Relationship Between Limiting Viscosity and Stereoregularity

In the case where the limiting viscosity $\eta$ of the crystalline polyolefin of the present invention is low, the adhesive strength is increased, but residual glue is likely to be left, and therefore, the meso pentad fraction mmmm is preferably higher. On the other hand, in the case where the limiting viscosity $\eta$ is high, the adhesive strength is decreased, but residual glue is less likely to be left, and therefore, the meso pentad fraction mmmm is preferably lower. Accordingly, the relationship between the limiting viscosity and the stereoregularity of the crystalline polyolefin of the present invention is required to satisfy the above formula (i).

The relationship between the limiting viscosity and the stereoregularity of the crystalline polyolefin of the present invention preferably satisfies the following formula (ii) from the viewpoint of adhesiveness and compatibility with an amorphous polyolefin.

$$-20 \times \eta + 58 \leq \text{mmmm} \leq -20 \times \eta + 60 \qquad \text{formula (ii)}$$

(In the formula, $\eta$ represents the limiting viscosity measured in tetralin at 135° C., and mmmm represents the meso pentad fraction (mol %).)

(b1) Meso Pentad Fraction (mmmm)

In the case where the crystalline polyolefin of the present invention is a homopolymer, from the viewpoint that an adhesive composition using the polyolefin of the present invention leaves less residual glue, the meso pentad fraction (mmmm) thereof is from 20 to 60 mol %, preferably from 40 to 58 mol %, more preferably from 48 to 56 mol %. The measurement method of the meso pentad fraction (mmmm) will be described below.

(b2) Limiting Viscosity [$\eta$]

From the viewpoint that an adhesive composition using the polyolefin of the present invention leaves less residual glue, the limiting viscosity [$\eta$] of the crystalline polyolefin of the present invention is from 0.01 to 2.0 dL/g, preferably from 0.1 to 1.0 dL/g, more preferably from 0.1 to 0.6 dL/g, further more preferably from 0.2 to 0.5 dL/g. Here, the limiting viscosity is measured in tetralin at 135° C. using an Ubbelohde type viscosity tube.

In the case where coating is carried out after melting the composition by heating such as hot-melt coating or calender coating, if the composition contains a high-melting point polyolefin, it is necessary to raise the temperature to high when coating is carried out, and therefore, coating cannot be carried out in some cases depending on a base material. Further, a high-melting point polyolefin is hardly dissolved in a solvent such as toluene, and therefore, a problem that the concentration cannot be increased in the case of carrying out solvent casting or the like may occur. Further, if the melting point or the melting endothermic amount $\Delta H$ is low, the holding strength becomes insufficient, and also residual glue is left. Due to this, in consideration of the balance between the viewpoint of the coatability and the viewpoint of the holding strength and residual glue, the melting point of the crystalline polyolefin of the present invention is preferably 20° C. or higher and 160° C. or lower, more preferably 20° C. or higher and 140° C. or lower, further more preferably 20° C. or higher and 120° C. or lower, 80° C. or higher and 120° C. or lower. Further, also from the same viewpoints, the melting endothermic amount $\Delta H$ of the crystalline polyolefin of the present invention is preferably 5 J/g or more and 100 J/g or less, more preferably 10 J/g or more and 100 J/g or less, further more preferably 10 J/g or more and 90 J/g or less. The melting point Tm and the melting endothermic amount $\Delta H$ are measured by the methods described in Examples.

Further, the crystalline polyolefin of the present invention preferably satisfies the following (b3) and (b4).

(b3) The racemic pentad fraction (rrrr) and (1-mmmm) satisfy the following relationship.

$$[(\text{rrrr})/(1-\text{mmmm})] \leq 0.1$$

(b4) The amount (W25) of a component eluted at 25° C. or lower by temperature rising chromatography is from 20 to 100% by mass.

(b3) Relationship Between Racemic Pentad Fraction (rrrr) and (1-mmmm)

From the viewpoint of the residual glue, the following relationship between the racemic pentad fraction (rrrr) of the crystalline polyolefin (2) to be used in the adhesive composition of the first embodiment of the present invention and (1-mmmm):(rrrr)/(1-mmmm) is preferably 0.1 or less, more preferably 0.06 or less, further more preferably 0.04 or less. Here, (rrrr) and (mmmm) are calculated not as a numerical value in the unit of mol %, but as a common proportion.

(b4) Amount (W25) of Component Eluted at 25° C. or Lower

The amount (W25) of a component eluted at 25° C. or lower by temperature rising chromatography of the crystalline polyolefin (2) to be used in the adhesive composition of the first embodiment of the present invention is preferably from 20 to 100% by mass, more preferably from 30 to 100% by mass, further more preferably from 50 to 100% by mass, particularly preferably from 60 to 100% by mass. W25 is the amount (% by mass) of a component which is eluted without being adsorbed on a filler when the TREF column temperature is 25° C. in an elution curve obtained based on measurement by temperature rising chromatography. W25 is an index indicating whether the polyolefin is a flexible polyolefin or not. A larger value of W25 indicates that a component having a low elastic modulus is increased, and/or the non-uniformity of stereoregularity distribution extends.

The crystalline polyolefin of the present invention is not particularly limited, but is preferably a polymer of an olefin having 2 to 12 carbon atoms, more preferably a polymer of an $\alpha$-olefin having 3 to 12 carbon atoms. The crystalline polyolefin of the present invention may be a copolymer, but is preferably a 1-butene homopolymer or a propylene homopolymer, and particularly preferably a propylene homopolymer.

(Production Method for Crystalline Polyolefin of the Present Invention)

Examples of the production method for the crystalline polyolefin of the present invention include a production method for a propylene homopolymer or a 1-butene homopolymer by homopolymerization of propylene or 1-butene using a metallocene catalyst and a production method for a 1-butene-propylene copolymer by copolymerization of 1-butene and propylene (further an α-olefin having 5 to 20 carbon atoms to be used as needed) using a metallocene catalyst. The crystallinity of the polyolefin to be obtained can be controlled by appropriately selecting the catalyst or adjusting the monomer concentration. Examples of the method for controlling the molecular weight of the polymer include selection of the type of the respective catalyst components, the use amount, or the polymerization temperature, and polymerization in the presence of hydrogen. For example, the crystalline polyolefin of the present invention can be obtained under the polymerization conditions shown in Examples of the present invention.

In the present invention, among the metallocene catalysts, a case where a catalyst is composed of a transition metal compound in which a ligand forms a crosslinked structure through a crosslinking group is preferred, and above all, a method using a metallocene catalyst obtained by combining a transition metal compound, in which a crosslinked structure is formed through two crosslinking groups, with a promoter is more preferred.

Specific examples of the method include a method of homopolymerizing propylene or 1-butene and a method of copolymerizing 1-butene and propylene (and further, an α-olefin having 5 to 20 carbon atoms to be used as needed), wherein the homopolymerization or the copolymerization is carried out in the presence of a polymerization catalyst containing (A) a transition metal compound represented by the general formula (I), and (B) a component selected from (B-1) a compound capable of reacting with the transition metal compound as the component (A) or a derivative thereof to form an ionic complex and (B-2) an aluminoxane.

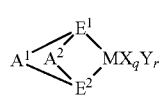

(I)

[In the formula, M represents a metal element of Groups 3 to 10 of the Periodic Table or a metal element of the lanthanoid series. $E^1$ and $E^2$ each represent a ligand selected from a substituted cyclopentadienyl group, an indenyl group, a substituted indenyl group, a heterocyclopentadienyl group, a substituted heterocyclopentadienyl group, an amide group, a phosphide group, a hydrocarbon group, and a silicon-containing group, and form a crosslinked structure through $A^1$ and $A^2$, and further, $E^1$ and $E^2$ may be the same as or different from each other. X represents a σ-bonding ligand, and when plural X's are present, plural X's may be the same as or different from each other and may be crosslinked with any other X, $E^1$, $E^2$, or Y. Y represents a Lewis base, and when plural Y's are present, plural Y's may be the same as or different from each other and may be crosslinked with any other Y, $E^1$, $E^2$, or X. $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$, or —AlR$^1$—, wherein R$^1$ represents a hydrogen atom, a halogen atom, a hydrocarbon group having 1 to 20 carbon atoms, or a halogen-containing hydrocarbon group having 1 to 20 carbon atoms, and $A^1$ and $A^2$ may be the same as or different from each other. q is an integer of 1 to 5 and represents [(the valence of M)−2], and r represents an integer of 0 to 3].

In the above general formula (I), M represents a metal element of Groups 3 to 10 of the Periodic Table or a metal element of the lanthanoid series, and specific examples thereof include titanium, zirconium, hafnium, yttrium, vanadium, chromium, manganese, nickel, cobalt, palladium, and lanthanoid series metals. Among these, from the viewpoint of the olefin polymerization activity or the like, metal elements of Group 4 of the Periodic Table are preferred, and particularly, titanium, zirconium, and hafnium are preferred.

$E^1$ and $E^2$ each represent a ligand selected from a substituted cyclopentadienyl group, an indenyl group, a substituted indenyl group, a heterocyclopentadienyl group, a substituted heterocyclopentadienyl group, an amide group (—N<), a phosphine group (—P<), a hydrocarbon group [>CR—, >C<], and a silicon-containing group [>SiR—, >Si<](wherein R is hydrogen or a hydrocarbon group having 1 to 20 carbon atoms or a heteroatom-containing group), and form a crosslinked structure through $A^1$ and $A^2$. $E^1$ and $E^2$ may be the same as or different from each other. As $E^1$ and $E^2$, a substituted cyclopentadienyl group, an indenyl group, and a substituted indenyl group are preferred. Examples of the substituent include a hydrocarbon group having 1 to 20 carbon atoms and a silicon-containing group.

Further, X represents a σ-bonding ligand, and in the case where plural X's are present, plural X's may be the same as or different from each other and may be crosslinked with any other X, $E^1$, $E^2$, or Y. Specific examples of this X include a halogen atom, a hydrocarbon group having 1 to 20 carbon atoms, an alkoxy group having 1 to 20 carbon atoms, an aryloxy group having 6 to 20 carbon atoms, an amide group having 1 to 20 carbon atoms, a silicon-containing group having 1 to 20 carbon atoms, a phosphide group having 1 to 20 carbon atoms, a sulfide group having 1 to 20 carbon atoms, and an acyl group having 1 to 20 carbon atoms.

Examples of the halogen atom include a chlorine atom, a fluorine atom, a bromine atom, and an iodine atom. Specific examples of the hydrocarbon group having 1 to 20 carbon atoms include an alkyl group such as a methyl group, an ethyl group, a propyl group, a butyl group, a hexyl group, a cyclohexyl group, and an octyl group; an alkenyl group such as a vinyl group, a propenyl group, and a cyclohexenyl group; an arylalkyl group such as a benzyl group, a phenylethyl group, and a phenylpropyl group; and an aryl group such as a phenyl group, a tolyl group, a dimethylphenyl group, a trimethylphenyl group, an ethylphenyl group, a propylphenyl group, a biphenyl group, a naphthyl group, a methylnaphthyl group, an anthracenyl group, and a phenanthryl group. Above all, an alkyl group such as a methyl group, an ethyl group, and a propyl group; and an aryl group such as a phenyl group are preferred.

Examples of the alkoxy group having 1 to 20 carbon atoms include an alkoxy group such as a methoxy group, an ethoxy group, a propoxy group, and a butoxy group; phenylmethoxy group, and a phenylethoxy group. Examples of the aryloxy group having 6 to 20 carbon atoms include a phenoxy group, a methylphenoxy group, and a dimethylphenoxy group. Examples of the amide group having 1 to 20 carbon atoms include an alkylamide group such as a dimethylamide group, a diethylamide group, a dipropylamide group, a dibutylamide group, a dicyclohexylamide group, and a methylethylamide group; an alkenylamide group such as a divinylamide group, a dipropenylamide group, and a dicyclohexenylamide group; an arylalkylamide group such as a dibenzylamide group, a phenylethylamide group, and a phenylpropylamide group; and an arylamide group such as a diphenylamide group and a dinaphthylamide group.

Examples of the silicon-containing group having 1 to 20 carbon atoms include a mono-hydrocarbon-substituted silyl group such as a methylsilyl group and a phenylsilyl group; a dihydrocarbon-substituted silyl group such as a dimethylsilyl group and a diphenylsilyl group; a trihydrocarbon-substituted silyl group such as a trimethylsilyl group, a triethylsilyl group, a tripropylsilyl group, a tricyclohexylsilyl group, a triphenylsilyl group, a dimethylphenylsilyl group, a methyldiphenylsilyl group, a tritolylsilyl group, and a trinaphthylsilyl group; a hydrocarbon-substituted silyl ether group such as a trimethylsilyl ether group; a silicon-substituted alkyl group such as a trimethylsilylmethyl group; and a silicon-substituted aryl group such as a trimethylsilylphenyl group. Above all, a trimethylsilylmethyl group, a phenyldimethylsilylethyl group, and the like are preferred.

Examples of the phosphide group having 1 to 40 carbon atoms include a dialkyl phosphide group such as a dimethyl phosphide group, a diethyl phosphide group, a dipropyl phosphide group, a dibutyl phosphide group, a dihexyl phosphide group, a dicyclohexyl phosphide group, and a dioctyl phosphide group; a dialkenyl phosphide group such as a divinyl phosphide group, a dipropenyl phosphide group, and a dicyclohexenyl phosphide group; a bis(arylalkyl) phosphide group such as a dibenzyl phosphide group, a bis(phenylethyl) phosphide group, and a bis(phenylpropyl) phosphide group; and a diaryl phosphide group such as a diphenyl phosphide group, a ditolyl phosphide group, a bis(dimethylphenyl) phosphide group, a bis(trimethylphenyl) phosphide group, a bis(ethylphenyl) phosphide group, a bis(propylphenyl) phosphide group, a bis(biphenyl) phosphide group, a bis(naphthyl) phosphide group, a bis(methylnaphthyl) phosphide group, a bis(anthracenyl) phosphide group, and a bis(phenanthryl phosphide) group.

Examples of the sulfide group having 1 to 20 carbon atoms include an alkyl sulfide group such as a methyl sulfide group, an ethyl sulfide group, a propyl sulfide group, a butyl sulfide group, a hexyl sulfide group, a cyclohexyl sulfide group, and an octyl sulfide group; an alkenyl sulfide group such as a vinyl sulfide group, a propenyl sulfide group, and a cyclohexenyl sulfide group; an arylalkyl sulfide group such as a benzyl sulfide group, a phenylethyl sulfide group, and a phenylpropyl sulfide group; and an aryl sulfide group such as a phenyl sulfide group, a tolyl sulfide group, a dimethylphenyl sulfide group, a trimethylphenyl sulfide group, an ethylphenyl sulfide group, a propylphenyl sulfide group, a biphenyl sulfide group, a naphthyl sulfide group, a methylnaphthyl sulfide group, an anthracenyl sulfide group, and a phenanthryl sulfide group.

Examples of the acyl group having 1 to 20 carbon atoms include a formyl group; an alkylacyl group such as an acetyl group, a propionyl group, a butyryl group, a valeryl group, a palmitoyl group, a stearoyl group, and an oleoyl group; an arylacyl group such as a benzoyl group, a toluoyl group, a salicyloyl group, a cinnamoyl group, a naphthoyl group, and a phthaloyl group; and an oxalyl group, a malonyl group, and a succinyl group, which are derived from oxalic acid, malonic acid, and succinic acid, each being a dicarboxylic acid, respectively.

On the other hand, Y represents a Lewis base, and in the case where plural Y's are present, plural Y's may be the same as or different from each other and may be crosslinked with any other Y, $E^1$, $E^2$, or X. Specific examples of the Lewis base represented by Y include amines, ethers, phosphines, and thioethers.

Examples of the amines include amines having 1 to 20 carbon atoms, and specific examples thereof include alkylamines such as methylamine, ethylamine, propylamine, butylamine, cyclohexylamine, methylethylamine, dimethylamine, diethylamine, dipropylamine, dibutylamine, dicyclohexylamine, and methylethylamine; alkenylamines such as vinylamine, propenylamine, cyclohexenylamine, divinylamine, dipropenylamine, and dicyclohexenylamine; arylalkylamines such as phenylamine, phenylethylamine, and phenylpropylamine; and arylamines such as diphenylamine and dinaphthylamine.

Examples of the ethers include aliphatic monoether compounds such as methyl ether, ethyl ether, propyl ether, isopropyl ether, butyl ether, isobutyl ether, n-amyl ether, and isoamyl ether; aliphatic mixed ether compounds such as methylethyl ether, methylpropyl ether, methylisopropyl ether, methyl-n-amyl ether, methylisoamyl ether, ethylpropyl ether, ethylisopropyl ether, ethylbutyl ether, ethylisobutyl ether, ethyl-n-amyl ether, and ethylisoamyl ether; aliphatic unsaturated ether compounds such as vinyl ether, allyl ether, methylvinyl ether, methylallyl ether, ethylvinyl ether, and ethylallyl ether; aromatic ether compounds such as anisole, phenetole, phenyl ether, benzyl ether, phenylbenzyl ether, α-naphthyl ether, and β-naphthyl ether; and cyclic ether compounds such as ethylene oxide, propylene oxide, trimethylene oxide, tetrahydrofuran, tetrahydropyran, and dioxane.

Examples of the phosphines include phosphines having 1 to 30 carbon atoms. Specific examples thereof include alkyl phosphines including monohydrocarbon-substituted phosphines such as methyl phosphine, ethyl phosphine, propyl phosphine, butyl phosphine, hexyl phosphine, cyclohexyl phosphine, and octyl phosphine; dihydropcarbon-substituted phosphines such as dimethyl phosphine, diethyl phosphine, dipropyl phosphine, dibutyl phosphine, dihexyl phosphine, dicyclohexyl phosphine, and dioctyl phosphine; trihydrocarbon-substituted phosphines such as trimethyl phosphine, triethyl phosphine, tripropyl phosphine, tributyl phosphine, trihexyl phosphine, tricyclohexyl phosphine, and trioctyl phosphine; monoalkenyl phosphines such as vinyl phosphine, propenyl phosphine, and cyclohexenyl phosphine; dialkenyl phosphines in which two hydrogen atoms of phosphine are each substituted with alkenyl; trialkenyl phosphines in which three hydrogen atoms of phosphine are each substituted with alkenyl; and arylphosphines including arylalkyl phosphines such as benzyl phosphine, phenylethyl phosphine, and phenylpropyl phosphine; diarylalkyl phosphines or aryldialkyl phosphines in which three hydrogen atoms of phosphine are each substituted with aryl or alkenyl; phenyl phosphine, tolyl phosphine, dimethylphenyl phosphine, trimethylphenyl phosphine, ethylphenyl phosphine, propylphenyl phosphine, biphenyl phosphine, naphthyl phosphine, methylnaphthyl phosphine, anthracenyl phosphine, and phenanthryl phosphine; di(alkylaryl) phosphines in which two hydrogen atoms of phosphine are each substituted with alkylaryl; and tri(alkylaryl)phosphines in which three hydrogen atoms of phosphine are each substituted with alkylaryl. Examples of the thioethers include the above-mentioned sulfides.

Next, $A^1$ and $A^2$ are each a divalent crosslinking group, which bonds two ligands, and each represent a hydrocarbon group having 1 to 20 carbon atoms, a halogen-containing hydrocarbon group having 1 to 20 carbon atoms, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$—, or —AlR$^1$—, wherein R$^1$ represents a hydrogen atom, a halogen atom, a hydrocarbon group having 1 to 20 carbon atoms, or a halogen-containing hydrocarbon group having 1 to 20 carbon atoms, and A$^1$ and A$^2$ may be the same as or different from each other. Examples of such a crosslinking group include a group represented by the following general formula.

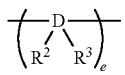

(D is carbon, silicon, or tin. R$^2$ and R$^3$ are each a hydrogen atom or a hydrocarbon group having 1 to 20 carbon atoms, and may be the same as or different from each other, or may be bonded to each other to form a ring structure. e represents an integer of 1 to 4.)

Specific examples thereof include a methylene group, an ethylene group, an ethylidene group, a propylidene group, an isopropylidene group, a cyclohexylidene group, a 1,2-cyclohexylene group, a vinylidene group (CH$_2$=C=), a dimethylsilylene group, a diphenylsilylene group, a methylphenylsilylene group, a dimethylgermylene group, a dimethylstannylene group, a tetramethyldisilylene group, and a diphenyldisilylene group. Among these, an ethylene group, an isopropylidene group, and a dimethylsilylene group are preferred.

q is an integer of 1 to 5 and represents [(the valence of M)−2], and r represents an integer of 0 to 3.

Among such transition metal compounds represented by the general formula (I), a transition metal compound containing a double-crosslinked biscyclopentadienyl derivative as a ligand represented by the following general formula (II) is preferred.

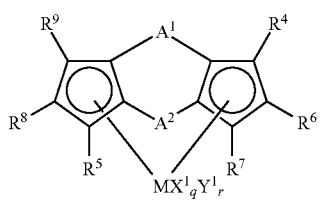

(II)

In the above general formula (II), M, A$^1$, A$^2$, q, and r are the same as described above.

X$^1$ represents a σ-bonding ligand, and when plural X$^1$'s are present, plural X$^1$'s may be the same as or different from each other and may be crosslinked with any other X$^1$ or Y$^1$. Specific examples of this X$^1$ include the same ones as those given in the explanation of X in the general formula (I).

Y$^1$ represents a Lewis base, and when plural Y$^1$'s are present, plural Y$^1$'s may be the same as or different from each other and may be crosslinked with any other Y$^1$ or X$^1$. Specific examples of this Y$^1$ include the same ones as those given in the explanation of Y in the general formula (I). R$^4$ to R$^9$ each represent a hydrogen atom, a halogen atom, a hydrocarbon group having 1 to 20 carbon atoms, a halogen-containing hydrocarbon group having 1 to 20 carbon atoms, a silicon-containing group, or a heteroatom-containing group, and it is necessary that at least one of R$^4$ to R$^9$ should not be a hydrogen atom. Further, R$^4$ to R$^9$ may be the same as or different from each other, and the groups adjacent to each other may be bonded to each other to form a ring. Above all, it is preferred that R$^6$ and R$^7$ form a ring, and R$^8$ and R$^9$ form a ring. As R$^4$ and R$^5$, a group containing a heteroatom such as oxygen, halogen, or silicon is preferred because the polymerization activity is increased. As another preferred embodiment, it is preferred that R$^4$ and R$^6$ or R$^6$ and R$^7$ form a ring, and R$^5$ and R$^8$ or R$^8$ and R$^9$ form a ring. As the substituent in the case where R$^4$ and R$^5$, R$^7$, or R$^9$ do not form a ring, a group containing a heteroatom such as oxygen, halogen, or silicon is preferred from the viewpoint of the polymerization activity.

The transition metal compound containing this double-crosslinked biscyclopentadienyl derivative as a ligand preferably contains silicon in a crosslinking group between the ligands.

Specific examples of the transition metal compound represented by the general formula (I) include the specific examples described in WO 02/16450 as preferred examples also in the present invention. More preferred specific examples thereof include (1,2'-dimethylsilylene)(2,1'-dimethylsilylene)bis(3-n-butylindenyl)zirconium dichloride, (1,2'-methylphenylsilylene)(2,1'-methylphenylsilylene)bis(3-trimethylsilylmethylindenyl) zirconium dichloride (Sym.), and (1,2'-dimethylsilylene)(2',1-dimethylsilylene)bis(3-neopentylindenyl) zirconium dichloride.

Next, any compound can be used as the component (B-1) in the components (B) as long as it is a compound which can be reacted with the transition metal compound as the component (A) described above to form an ionic complex, however, a compound represented by the following general formula (III) or (IV) can be preferably used.

　　(III)

　　(IV)

(In the formulae, L$^2$ is M$^2$, R$^{11}$R$^{12}$M$^3$, R$^{13}$$_3$C, or R$^{14}$M$^3$.)

In the above general formulae (III) and (IV), L$^1$ represents a Lewis base, [Z]— represents a non-coordinating anion [Z$^1$]— or [Z$^2$]—.

[Z$^1$]— represents an anion in which plural groups are bonded to an element, that is, [M$^1$G$^1$G$^2$ . . . G$^f$]—. Here, M$^1$ represents an element of Groups 5 to 15 of the Periodic Table, preferably an element of Groups 13 to 15 of the Periodic Table. G$^1$ to G$^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 40 carbon atoms, an arylalkyl group having 7 to 40 carbon atoms, a halogen-substituted hydrocarbon group having 1 to 20 carbon atoms, an acyloxy group having 1 to 20 carbon atoms, an organic metalloid group, or a heteroatom-containing hydrocarbon group having 2 to 20 carbon atoms. Two or more groups of G$^1$ to G$^f$ may form a ring. f represents an integer of [(the valence of the central metal M$^1$)+1]).

[Z$^2$]— represents a conjugate base of a Bronsted acid, in which the logarithm (pKa) of an inverse number of an acid dissociation constant is −10 or less, alone or a combination of a Bronsted acid and a Lewis acid, or a conjugate base of an acid generally defined as an ultrastrong acid. Further, a Lewis base may be coordinated.

R[10] represents a hydrogen atom, an alkyl group having 1 to 20 carbon atoms, an aryl group having 6 to 20 carbon atoms, an alkylaryl group, or an arylalkyl group.

R[11] and R[12] each represent a cyclopentadienyl group, a substituted cyclopentadienyl group, an indenyl group, or a fluorenyl group.

R[13] represents an alkyl group having 1 to 20 carbon atoms, an aryl group, an alkylaryl group, or an arylalkyl group.

R[14] represents a large cyclic ligand such as tetraphenylporphyrin or phthalocyanine. k is the ionic valence of each of [L[1]-R[10]] and [L[2]], and represents an integer of 1 to 3, a represents an integer of 1 or more, and b is (k×a). $M^2$ includes an element of Groups 1 to 3, 11 to 13, and 17 of the Periodic Table, and $M^3$ represents an element of Groups 7 to 12 of the Periodic Table.

Here, specific examples of $L^1$ include ammonia, amines such as methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline, and p-nitro-N,N-dimethylaniline, phosphines such as triethylphosphine, triphenylphosphine, and diphenylphosphine, thioethers such as tetrahydrothiophene, esters such as ethyl benzoate, and nitriles such as acetonitrile and benzonitrile.

Specific examples of R[10] include hydrogen, a methyl group, an ethyl group, a benzyl group, and a trityl group. Specific examples of R[11] and R[12] include a cyclopentadienyl group, a methylcyclopentadienyl group, an ethylcyclopentadienyl group, and a pentamethylcyclopentadienyl group. Specific examples of R[13] include a phenyl group, a p-tolyl group, and a p-methoxyphenyl group. Specific examples of R[14] include teteraphenylporphine, phthalocyanine, allyl, and metallyl. Specific examples of $M^2$ include Li, Na, K, Ag, Cu, Br, I, and $I_3$. Specific examples of $M^3$ include Mn, Fe, Co, Ni, and Zn.

Further, in $[Z^1]-$, that is, $[M^1G^1G^2 \ldots G^f]-$, specific examples of $M^1$ include B, Al, Si, P, As, and Sb, and preferred examples thereof include B and Al. Specific examples of $G^1$, $G^2$ to $G^f$ include a dialkylamino group such as a dimethylamino group and a diethylamino group, an alkoxy group or an aryloxy group such as a methoxy group, an ethoxy group, an n-butoxy group, and a phenoxy group, a hydrocarbon group such as a methyl group, an ethyl group, an n-propyl group, an isopropyl group, an n-butyl group, an isobutyl group, an n-octyl group, an n-eicosyl group, a phenyl group, a p-tolyl group, a benzyl group, a 4-t-butylphenyl group, and a 3,5-dimethylphenyl group, a halogen atom such as fluorine, chlorine, bromine, and iodine, a heteroatom-containing hydrocarbon group such as a p-fluorophenyl group, a 3,5-difluorophenyl group, a pentachlorophenyl group, a 3,4,5-trifluorophenyl group, a pentafluorophenyl group, a 3,5-bis(trifluoromethyl)phenyl group, and a bis(trimethylsilyl)methyl group, and an organic metalloid group such as a pentamethylantimony group, a trimethylsilyl group, a trimethylgermyl group, a diphenylarsine group, a dicyclohexylantimony group, and diphenylboron.

Also, specific examples of the non-coordinating anion, that is, the conjugate base $[Z^2]-$ of a Bronsted acid having a pKa of −10 or less alone or a combination of a Bronsted acid with a Lewis acid include a trifluoromethanesulfonic acid anion $(CF_3SO_3)-$, a bis(trifluoromethanesulfonyl)methyl anion, a bis(trifluoromethanesulfonyl)benzyl anion, bis(trifluoromethanesulfonyl)amide, a perchloric acid anion $(ClO_4)-$, a trifluoroacetic acid anion $(CF_3CO_2)-$, a hexafluoroantimony anion $(SbF_6)-$, a fluorosulfonic acid anion $(FSO_3)-$, a chlorosulfonic acid anion $(ClSO_3)-$, a fluorosulfonic acid anion/an antimony pentafluoride $(FSO_3/SbF_5)-$, a fluorosulfonic acid anion/arsenic pentafluoride $(FSO_3/AsF_5)-$, and trifluoromethanesulfonic acid/antimony pentafluoride $(CF_3SO_3/SbF_5)-$.

Specific examples of the ionic compound which is reacted with the transition metal compound as the component (A) described above to form an ionic complex, that is, the compound as the component (B-1) include triethylammonium tetraphenylborate, tri-n-buthylammonium tetraphenylborate, trimethylammonium tetraphenylborate, tetraethylammonium tetraphenylborate, methyl(tri-n-butyl) ammonium tetraphenylborate, benzyl(tri-n-butyl) ammonium tetraphenylborate, dimethyldiphenylammonium tetraphenylborate, triphenyl(methyl) ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl) ammonium tetrakis(pentafluorophenyl) borate, methyldiphenylammonium tetrakis(pentafluorophenyl)borate, triphenyl(methyl)ammonium tetrakis(pentafluorophenyl)borate, methylanilinium tetrakis (pentafluorophenyl)borate, dimethylanilinium tetrakis (pentafluorophenyl)borate, trimethylanilinium tetrakis (pentafluorophenyl)borate, methylpyridinium tetrakis (pentafluorophenyl)borate, benzylpyridinium tetrakis (pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis[bis(3,5-ditrifluoromethyl)phenyl]borate, ferrocenium tetraphenylborate, silver tetraphenylborate, triethyl tetraphenylborate, tetraphenylporphyrinmanganese tetraphenylborate, ferrocenium tetrakis (pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis (pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

As (B-1), one type may be used or two or more types may be used in combination.

On the other hand, examples of the aluminoxane as the component (B-2) include a chain aluminoxane represented by the general formula (V):

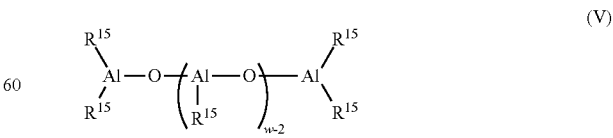

wherein R[15] represents a hydrocarbon group such as an alkyl group having 1 to 20 carbon atoms, preferably 1 to 12 carbon atoms, an alkenyl group, an aryl group, or an arylalkyl group or a halogen atom; and w represents an average polymerization degree and is an integer of usually 2 to 50, preferably 2 to 40, provided that the respective $R^{15}$'s may be the same as or different from each other, and a cyclic aluminoxane represented by the general formula (VI):

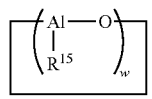

wherein $R^{15}$ and w are the same as those in the above general formula (V).

Examples of the production method for the aluminoxane described above include a method in which alkylaluminum is brought into contact with a condensing agent such as water, but a means thereof is not particularly limited, and they may be reacted according to a known method. Examples of the method include (i) a method in which an organic aluminum compound is dissolved in an organic solvent, and then the resulting solution is brought into contact with water, (ii) a method in which an organic aluminum compound is first added when carrying out polymerization, and then water is added thereto, (iii) a method in which an organic aluminum compound is reacted with crystal water contained in a metal salt or the like, or water adsorbed on an inorganic substance or an organic substance, and (iv) a method in which trialkylaluminum is reacted with tetraalkyldialuminoxane and the reaction product is further reacted with water. The aluminoxane may be an aluminoxane which is insoluble in toluene.

Among these aluminoxanes, one type may be used or two or more types may be used in combination.

The use proportion of the catalyst component (A) to the catalyst component (B) is in the range of preferably 10:1 to 1:100, more preferably 2:1 to 1:10 in terms of molar ratio when the compound (B-1) is used as the catalyst component (B), and when it deviates from the above range, the catalyst cost per unit mass of the polymer increases, so that it is not practical. When the compound (B-2) is used, the use proportion is in the range of preferably 1:1 to 1:1,000,000, more preferably 1:10 to 1:10,000 in terms of molar ratio. When it deviates from the above range, the catalyst cost per unit mass of the polymer increases, so that it is not practical. Further, as the catalyst component (B), (B-1) and (B-2) can be used alone or two or more types can be used in combination.

In the polymerization catalyst in the above production method, an organic aluminum compound as a component (C) can be used in addition to the component (A) and the component (B) described above.

Here, as the organic aluminum compound serving as the component (C), a compound represented by the general formula (VII) is used:

wherein $R^{16}$ represents an alkyl group having 1 to 10 carbon atoms, J represents a hydrogen atom, an alkoxy group having 1 to 20 carbon atoms, an aryl group having 6 to 20 carbon atoms, or a halogen atom, and v is an integer of 1 to 3.

Specific examples of the compound represented by the above general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

Among these organic aluminum compounds, one type may be used or two or more types may be used in combination.

In the production method, preliminary contact can also be carried out using the component (A), the component (B), and the component (C) described above. The preliminary contact can be carried out by, for example, bringing the component (B) into contact with the component (A), but the method is not particularly limited, and a known method can be used. This preliminary contact is effective in the reduction in the catalyst cost due to the improvement of the catalyst activity, the reduction in the use proportion of the component (B) which is a promoter. Further, by bringing the component (A) into contact with the component (B-2), an effect of improving the molecular weight can be seen in addition to the effect described above. The preliminary contact temperature is usually −20° C. to 200° C., preferably −10° C. to 150° C., more preferably 0° C. to 80° C. In the preliminary contact, an aliphatic hydrocarbon, an aromatic hydrocarbon, or the like can be used as an inert hydrocarbon serving as a solvent. Among these, an aliphatic hydrocarbon is particularly preferred.

The use proportion of the catalyst component (A) to the catalyst component (C) is in the range of preferably 1:1 to 1:10,000, more preferably 1:5 to 1:2,000, further more preferably 1:10 to 1:1,000 in terms of molar ratio. By using the catalyst component (C), the polymerization activity per transition metal can be improved, however, if the amount thereof is too much, the organic aluminum compound is not only wasted, but also remains in a large amount in the polymer, and therefore the excessive amount thereof is not preferred.

In the present invention, at least one of the catalyst components can be carried on a suitable carrier and used. The type of the carrier is not particularly limited, and any of an inorganic oxide carrier, an inorganic carrier other than the inorganic oxide carrier, and an organic carrier can be used. However, in particular, an inorganic oxide carrier or an inorganic carrier other than the inorganic oxide carrier is preferred.

Specific examples of the inorganic oxide carrier include $SiO_2$, $Al_2O_3$, MgO, $ZrO_2$, $TiO_2$, $Fe_2O_3$, $B_2O_3$, CaO, ZnO, BaO, $ThO_2$, and mixtures thereof such as silica alumina, zeolite, ferrite, and glass fiber. Among these, $SiO_2$ and $Al_2O_3$ are particularly preferred. The inorganic oxide carrier described above may contain a small amount of a carbonate, a nitrate, a sulfate, or the like.

On the other hand, examples of the carrier other than the inorganic oxide carrier described above include magnesium compounds represented by the general formula: $MgR^{17}{}_xX^1{}_y$, typified by $MgCl_2$, $Mg(OC_2H_5)_2$, and the like, and complex salts thereof. Here, $R^{17}$ represents an alkyl group having 1 to 20 carbon atoms, an alkoxy group having 1 to 20 carbon atoms, or an aryl group having 6 to 20 carbon atoms, $X^1$ represents a halogen atom or an alkyl group having 1 to 20 carbon atoms, x is 0 to 2, y is 0 to 2, and x+y=2. The respective $R^{17}$'s or the respective $X^1$'s may be the same as or different from each other.

Further, examples of the organic carrier include polymers such as polystyrene, styrene-divinylbenzene copolymers, polyethylene, poly(1-butene), substituted polystyrene, and polyallylate, as well as starch and carbon.

As the carrier to be used in the production method described above, $MgCl_2$, $MgCl(OC_2H_5)$, $Mg(OC_2H_5)_2$, SiO$_2$, Al$_2$O$_3$, and the like are preferred. The properties of the carrier vary depending on the type thereof and the production method, however, the average particle diameter is usually from 1 to 300 μm, preferably from 10 to 200 μm, more preferably from 20 to 100 μm.

If the particle diameter is small, a fine powder in the polymer increases, and if the particle diameter is large, a coarse particle in the polymer increases to cause a reduction in the bulk density or the clogging of a hopper.

The carrier has a specific surface area of usually 1 to 1,000 m$^2$/g, preferably 50 to 500 m$^2$/g, and a pore volume of usually 0.1 to 5 cm$^3$/g, preferably 0.3 to 3 cm$^3$/g.

If either of the specific surface area and the pore volume deviates from the above range, the catalyst activity decreases in some cases. The specific surface area and the pore volume can be determined from the volume of adsorbed nitrogen gas according to, for example, a BET method.

Further, in the case where the carrier is an inorganic oxide carrier, the carrier is preferably used after it is fired at usually 150 to 1,000° C., preferably 200 to 800° C.

In the case where at least one of the catalyst components is carried on the carrier described above, it is desired to carry at least one of the catalyst component (A) and the catalyst component (B), preferably both of the catalyst component (A) and the catalyst component (B) on the carrier.

The method for carrying at least one of the component (A) and the component (B) on the carrier is not particularly limited, however, for example, (i) a method in which at least one of the component (A) and the component (B) is mixed with the carrier, (ii) a method in which the carrier is treated with an organic aluminum compound or a halogen-containing silicon compound, and then at least one of the component (A) and the component (B) is mixed therewith in an inert solvent, (iii) a method in which the carrier, the component (A) and/or the component (B), and an organic aluminum compound or a halogen-containing silicon compound are reacted with one another, (iv) a method in which the component (A) or the component (B) is carried on the carrier, and then the component (B) or the component (A) is mixed therewith, (v) a method in which a catalytic reaction product of the component (A) and the component (B) is mixed with the carrier, (vi) a method in which the carrier is allowed to coexist in the catalytic reaction of the component (A) and the component (B), or the like can be used.

In the reactions in the above (iv), (v), and (vi), it is also possible to add the organic aluminum compound as the component (C).

In the present invention, the catalyst may be prepared by irradiating an elastic wave when the components (A), (B), and (C) described above are brought into contact. As the elastic wave, generally a sonic wave, particularly preferably an ultrasonic wave can be used. To be specific, an ultrasonic wave with a frequency of 1 to 1,000 kHz, preferably an ultrasonic wave with a frequency of 10 to 500 kHz can be used.

The catalyst thus obtained may be used for polymerization after the solvent is evaporated off and the catalyst in the form of a solid is taken out or may be used for polymerization as it is.

Further, in the present invention, the catalyst can be produced by performing an operation of carrying at least one of the component (A) and the component (B) on the carrier in the polymerization system. For example, a method in which at least one of the component (A) and the component (B) and the carrier and, if necessary, the organic aluminum compound as the component (C) are added, and an olefin such as ethylene is added at an atmospheric pressure to 2 MPa (gauge) to carry out preliminary polymerization at −20 to 200° C. for about one minute to two hours, thereby forming catalyst particles can be used.

In the present invention, it is desired that the use proportion of the component (B-1) to the carrier is preferably from 1:5 to 1:10,000, more preferably from 1:10 to 1:500 in terms of mass ratio, and the use proportion of the component (B-2) to the carrier is preferably from 1:0.5 to 1:1,000, more preferably from 1:1 to 1:50 in terms of mass ratio. In the case where two or more components as the components (B) are mixed and used, the use proportion of each of the components (B) to the carrier is desirably in the above range in terms of mass ratio. Further, it is desired that the use proportion of the component (A) to the carrier is preferably from 1:5 to 1:10,000, more preferably from 1:10 to 1:500 in terms of mass ratio.

If the use proportion of the component (B) [the component (B-1) or the component (B-2)] to the carrier or the use proportion of the component (A) to the carrier deviates from the above range, the activity decreases in some cases. The thus prepared polymerization catalyst of the present invention has an average particle diameter of usually 2 to 200 μm, preferably 10 to 150 μm, particularly preferably 20 to 100 μm, and has a specific surface area of usually 20 to 1000 m$^2$/g, preferably 50 to 500 m$^2$/g. If the average particle diameter is less than 2 μm, a fine powder in the polymer increases in some cases, and if the average particle diameter exceeds 200 μm, a coarse particle in the polymer increases in some cases. If the specific surface area is less than 20 m$^2$/g, the activity decreases in some cases, and if the specific surface area exceeds 1,000 m$^2$/g, the bulk density of the polymer decreases in some cases. Further, in the catalyst of the present invention, the amount of the transition metal in 100 g of the carrier is usually from 0.05 to 10 g, particularly preferably from 0.1 to 2 g. If the amount of the transition metal is outside of the above range, the activity decreases in some cases.

An industrially advantageous polymer having a high bulk density and an excellent particle size distribution can be obtained by carrying the catalyst on the carrier in the manner described above.

As the crystalline polyolefin to be used in the present invention, by using the polymerization catalyst described above, a propylene homopolymer or a 1-butene homopolymer can be produced by homopolymerization of propylene or 1-butene, or a 1-butene-propylene copolymer can be produced by copolymerization of 1-butene and propylene.

In this case, the polymerization method is not particularly limited, and any method such as a slurry polymerization method, a gas-phase polymerization method, a bulk polymerization method, a solution polymerization method, or a suspension polymerization method may be used, however, a slurry polymerization method and a gas-phase polymerization method are particularly preferred.

With respect to the polymerization conditions, the polymerization temperature is usually from −100 to 250° C., preferably from −50 to 200° C., more preferably from 0 to 130° C. With respect to the use proportion of the catalyst to the reaction starting material, the starting material monomer/the component (A) described above (molar ratio) is preferably from 10$^5$ to 10$^8$, particularly preferably from 10$^6$ to 10$^7$. The polymerization time is usually from 5 minutes to 10 hours, and the reaction pressure is preferably from an atmospheric pressure to 3 MPa (gauge), more preferably from an atmospheric pressure to 2 MPa (gauge).

Examples of the method for controlling the molecular weight of the polymer include selection of the type of the respective catalyst components, the use amount, or the polymerization temperature, and polymerization in the presence of hydrogen.

In the case of using a polymerization solvent, for example, an aromatic hydrocarbon such as benzene, toluene, xylene, or ethylbenzene, an alicyclic hydrocarbon such as cyclopentane, cyclohexane, or methylcyclohexane, an aliphatic hydrocarbon such as pentane, hexane, heptane, or octane, a halogenated hydrocarbon such as chloroform or dichloromethane, or the like can be used. Among these solvents, one type may be used alone or two or more types may be used in combination. Further, a monomer such as an α-olefin may be used as the solvent. The polymerization can be carried out without using a solvent depending on the polymerization method.

In the polymerization, preliminary polymerization can be carried out using the polymerization catalyst described above. The preliminary polymerization can be carried out by bringing, for example, a small amount of an olefin into contact with the solid catalyst component. However, the method is not particularly limited, and a known method can be used. The olefin to be used for the preliminary polymerization is not particularly limited, and for example, ethylene, an α-olefin having 3 to 20 carbon atoms, a mixture thereof, or the like can be used. However, it is advantageous to use the same olefin as used in the polymerization.

The preliminary polymerization temperature is usually from −20 to 200° C., preferably from −10 to 130° C., more preferably from 0 to 80° C. In the preliminary polymerization, an aliphatic hydrocarbon, an aromatic hydrocarbon, a monomer, or the like can be used as a solvent. Among these, an aliphatic hydrocarbon is particularly preferred. The preliminary polymerization may be carried out without using a solvent.

In the preliminary polymerization, it is desired to control the conditions so that the limiting viscosity [η](measured in decalin at 135° C.) of the preliminary polymerization product is 0.2 dL/g or more, particularly 0.5 dL/g or more, and the amount of the preliminary polymerization product per millimole of the transition metal component in the catalyst is from 1 to 10,000 g, particularly from 10 to 1,000 g.

<Adhesive Composition>

The crystalline polyolefin of the present invention can be applied to an adhesive composition. The polyolefin of the present invention itself does not have adhesive strength, however, by using an amorphous polyolefin or a tackifier in combination, an adhesive composition can be formed, and an adhesive composition having a favorable balance between holding strength and residual glue can be provided.

From the viewpoint of the exhibition of adhesive strength and tackiness, the content of the crystalline polyolefin of the present invention in the adhesive composition of the present invention is 5% by mass or more and 95% by mass or less, preferably 10% by mass or more and 90% by mass or less, more preferably 15% by mass or more and 80% by mass or less, further more preferably 20% by mass or more and 70% by mass or less, still further more preferably 25% by mass or more and 55% by mass or less.

[Amorphous Polyolefin]

The adhesive composition of the present invention preferably contains the crystalline polyolefin of the present invention and a specific amorphous polyolefin.

The amorphous polyolefin to be used in the present invention preferably has a melting point (Tm) which is lower than 20° C. or is not observed by a differential scanning calorimeter (DSC) and has a melting endothermic amount (ΔH) of less than 5 J/g. The melting point Tm and the melting endothermic amount ΔH are measured by the methods described in Examples.

In the present invention, the phrase "the melting point is not observed by a differential scanning calorimeter (DSC)" refers to that the crystal melting peak cannot be practically observed because the crystallization rate is very slow in the DSC measurement or the crystallization does not occur at all. Incidentally, it is often the case that when the melting point is not observed, also the ΔH cannot be practically observed. Also in the case where the ΔH cannot be observed, the ΔH is regarded as less than 5 J/g. That is, the ΔH is not observed or is less than 5 J/g.

If the content of the amorphous polyolefin in the adhesive composition of the present invention is too high, the adhesive strength and tackiness are increased, but the holding strength is decreased and also residual glue is left, while on the other hand, if the content of the amorphous polyolefin is too low, the holding strength is increased and also less residual glue is left, but the adhesive strength and tackiness are decreased. Due to this, from the viewpoint of the balance of adhesive strength, tackiness, holding strength, and less residual glue, the content of the amorphous polyolefin in the adhesive composition of the present invention is preferably 5% by mass or more and 95% by mass or less, more preferably 10% by mass or more and 90% by mass or less, further more preferably 20% by mass or more and 85% by mass or less, still further more preferably 30% by mass or more and 80% by mass or less, yet still further more preferably 45% by mass or more and 75% by mass or less.

The amorphous polyolefin to be used in the present invention is not particularly limited, but is preferably a polymer of an olefin having 2 to 12 carbon atoms, more preferably a polymer of an α-olefin having 3 to 12 carbon atoms, further more preferably at least one member selected from the group consisting of a 1-butene homopolymer, a propylene homopolymer, and a 1-butene-propylene copolymer.

From the viewpoint of the improvement of the adhesive strength at low temperatures, it is preferred to use a 1-butene homopolymer having a lower glass transition temperature Tg than a propylene homopolymer.

The amorphous polyolefin to be used in the present invention preferably satisfies the following (a1) to (a5):

(a1) the meso pentad fraction (mmmm) is from 3 to 40 mol %, or the meso diad fraction (m) is from 30 to 95 mol %;

(a2) the sum of the 1,3-bond fraction and the 1,4-bond fraction is less than 0.3 mol %;

(a3) the 2,1-bond fraction is less than 0.3 mol %;

(a4) the molecular weight distribution (Mw/Mn) as measured by the gel permeation chromatography (GPC) method is 4.0 or less; and (a5) the weight-average molecular weight (Mw) as measured by the GPC method is from 5,000 to 1,000,000.

In the present invention, the meso pentad fraction (mmmm), the meso diad fraction (m), the 1,3-bond fraction, the 1,4-bond fraction, and the 2,1-bond fraction are determined in accordance with the methods proposed in "Polymer Journal, 16, 717 (1984)" reported by Asakura et al., in "Macromol. Chem. Phys., C29, 201 (1989)" reported by J. Randall et al., and in "Macromol. Chem. Phys., 198, 1257 (1997)" reported by V. Busico et al. That is, in the $^{13}C$ nuclear magnetic resonance spectrum, the signals for a methylene group and a methine group are read, and the meso pentad fraction (mmmm), the meso diad fraction (m), the 1,3-bond fraction, the 1,4-bond fraction, and the 2,1-bond fraction in the polyolefin chain are determined.

The measurement of the $^{13}$C-NMR spectrum is carried out using the following device under the following conditions.

Device: $^{13}$C-NMR spectrometer, JNM-EX400 series manufactured by JEOL, Ltd.
Method: proton complete decoupling method
Concentration: 230 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times The 1,3-bond fraction and the 2,1-bond fraction of each of a propylene homopolymer and a 1-butene-propylene copolymer can be calculated according to the following formulae based on the results of the above-mentioned measurement of the $^{13}$C-NMR spectrum.

$$\text{1,3-bond fraction} = (D/2)/(A+B+C+D) \times 100 \text{ (mol \%)}$$

$$\text{2,1-bond fraction} = [(A+B)/2]/(A+B+C+D) \times 100 \text{ (mol \%)}$$

A: value of integral at 15 to 15.5 ppm
B: value of integral at 17 to 18 ppm
C: value of integral at 19.5 to 22.5 ppm
D: value of integral at 27.6 to 27.8 ppm The 1,4-bond fraction of a 1-butene-propylene copolymer, and the 1,4-bond fraction and the 2,1-bond fraction of a 1-butene homopolymer can be calculated according to the following formulae based on the results of the above-mentioned measurement of the $^{13}$C-NMR spectrum.

$$\text{1,4-bond fraction} = E/(A+B+C+D+E) \times 100 \text{ (mol \%)}$$

$$\text{2,1-bond fraction} = \{(A+B+D)/3\}/(A+B+C+D) \times 100 \text{ (mol \%)}$$

A: value of integral at 29.0 to 28.2 ppm
B: value of integral at 35.4 to 34.6 ppm
C: value of integral at 38.3 to 36.5 ppm
D: value of integral at 43.6 to 42.8 ppm
E: value of integral at 31.1 ppm (a1) Meso Pentad Fraction (mmmm) and Meso Diad Fraction (m)

In the case where the amorphous polyolefin to be used in the present invention is a homopolymer, from the viewpoint that the adhesive composition of the present invention is repeatedly bonded, the meso pentad fraction (mmmm) thereof is preferably from 3 to 40 mol %, more preferably from 3 to 25 mol %, further more preferably from 3 to 10 mol %.

Further, in the case where the amorphous polyolefin to be used in the present invention is a 1-butene-propylene copolymer, from the viewpoint of the balance between the heat resistance and the adhesiveness, the meso diad fraction (m) thereof is preferably from 30 to 95 mol %, more preferably from 40 to 90 mol %, further more preferably from 50 to 85 mol %.

The 1-butene-propylene copolymer in the present invention refers to a copolymer in which the sum of the copolymerization ratio of a propylene unit and the copolymerization ratio of a 1-butene unit is 50 mol % or more, preferably 70 mol % or more, more preferably 90 mol % or more. Other than propylene and 1-butene, ethylene or an α-olefin having 5 or more carbon atoms (preferably an α-olefin having 5 to 20 carbon atoms) may be contained as a comonomer. Specific examples of the α-olefin to be used as a comonomer include dienes such as pentene-1, heptene-1, hexene-1, heptene-1, octene-1, decene-1, 1,4-methylpentene-1, 3-methylbutene-1, 1,3-butadiene, hexadiene, pentadiene, heptadiene, and octadiene.

The 1-butene-propylene copolymer is preferably a random copolymer.

Further, the 1-butene-propylene copolymer contains a structural unit obtained from 1-butene preferably at 15 mol % or more, more preferably at 50 mol % or more, particularly preferably at 75 mol % or more. In the case where the 1-butene unit is contained at 15 mol % or more, the low-temperature properties of an adhesive containing the copolymer are improved. From the viewpoint of the low-temperature properties, it is preferred to contain a larger amount of a structural unit obtained from 1-butene in the copolymer.

The respective structural units in the 1-butene-propylene copolymer can be calculated as follows based on the results of the above-mentioned measurement of the $^{13}$C-NMR spectrum.

[Diad Chain Strength]
a (propylene-propylene chain): value of integral at 48.0 to 46.2 ppm
b (propylene-butene chain): value of integral at 44.4 to 43.0 ppm
c (butene-butene chain): value of integral at 40.8 to 39.8 ppm

[Diad Chain Fraction (mol %)]
d (propylene-propylene chain fraction)=a/(a+b+c)×100 (mol %)
e (propylene-butene chain fraction)=b/(a+b+c)×100 (mol %)
f (butene-butene chain fraction)=c/(a+b+c)×100 (mol %)

[Copolymerization Ratio (mol %)]
propylene unit copolymerization ratio=d+e/2
1-butene unit copolymerization ratio=f+e/2

Further, the meso diad fraction (m) can be calculated according to the following formula based on the results of the above-mentioned measurement of the $^{13}$C-NMR spectrum.

$$\text{Meso diad fraction } (m) = (\text{value of integral at 40.4 to 39.9 ppm})/(\text{value of integral at 40.4 to 39.9 ppm} + \text{value of integral at 40.7 to 40.4 ppm})$$

(a2) 1,3-Bond Fraction and 1,4-Bond Fraction

The sum of the 1,3-bond fraction and the 1,4-bond fraction of the amorphous polyolefin to be used in the present invention is preferably less than 0.3 mol %, more preferably less than 0.1 mol %, further more preferably 0 mol %. When the sum is within the above range, the fluidity at low temperatures becomes favorable, so that the low-temperature adhesiveness is improved and also the compatibility with a tackifier becomes favorable.

The "sum of the 1,3-bond fraction and the 1,4-bond fraction" means the 1,3-bond fraction in the case where the amorphous polyolefin to be used in the present invention is a propylene homopolymer, and means the 1,4-bond fraction in the case where the amorphous polyolefin is a 1-butene homopolymer, and means the sum of the 1,3-bond fraction and the 1,4-bond fraction in the case where the amorphous polyolefin is a propylene-1-butene copolymer.

The control of the 1,3-bond fraction and the 1,4-bond fraction is carried out by the structure of a main catalyst and the polymerization conditions in the same manner as the control of the 2,1-bond fraction to be mentioned below.

(a3) 2,1-Bond Fraction

The 2,1-bond fraction of the amorphous polyolefin to be used in the present invention is preferably less than 0.3 mol %, more preferably less than 0.1 mol %, further more preferably 0 mol %. When the 2,1-bond fraction is within the above range, the fluidity at low temperatures becomes favorable, so that the low-temperature adhesiveness is improved and also the compatibility with a tackifier becomes favorable.

The control of the 2,1-bond fraction is carried out by the structure of a main catalyst and the polymerization conditions. Specifically, the structure of a main catalyst has a great influence, and by making a space where a monomer is inserted around the central metal of the main catalyst narrower, the 2,1-bond can be controlled, while on the other hand, by making the space wider, the 2,1-bond can be increased. For example, a catalyst called half-metallocene type catalyst has a wide space for insertion around the central metal, and therefore, a structure such as a 2,1-bond or a long-chain branch is easily formed. If a racemic metallocene catalyst is used, the 2,1-bond can be expected to be controlled, however, when a racemic catalyst is used, the stereoregularity is increased, and thus, it is difficult to obtain an amorphous polymer as shown in the present invention. For example, even in the case of a racemic catalyst to be mentioned below, by introducing a substituent into a double-crosslinked metallocene catalyst at the 3-position to control a space for insertion at the central metal, a polymer which is amorphous and has a very low 2,1-bond content can be obtained.

(a4) Molecular Weight Distribution (Mw/Mn)

The molecular weight distribution (Mw/Mn) of the amorphous polyolefin to be used in the present invention as measured by the GPC method is preferably 4 or less, more preferably 3.5 or less, further more preferably 3.0 or less. When the molecular weight distribution (Mw/Mn) is 4 or less, less residual glue is left when the amorphous polyolefin is used as the starting material of an adhesive.

(a5) Weight-Average Molecular Weight (Mw)

The weight-average molecular weight (Mw) of the amorphous polyolefin to be used in the present invention as measured by the GPC method is preferably from 5,000 to 1,000,000, more preferably from 9,000 to 200,000, further more preferably from 20,000 to 100,000. When the Mw is 5,000 or more, stickiness is reduced. Further, when the Mw is 1,000,000 or less, the fluidity is improved and the moldability (coatability) becomes favorable.

The above-mentioned weight-average molecular weight (Mw) and the number-average molecular weight (Mn) are a weight-average molecular weight and a number-average molecular weight in terms of polystyrene measured using the following device under the following conditions. The above-mentioned molecular weight distribution (Mw/Mn) is a value calculated from the weight-average molecular weight (Mw) and the number-average molecular weight (Mn).

<GPC Measuring Device>
Column: TOSO GMHHR-H(S)HT
Detector: RI detector for liquid chromatography, Waters 150C
<Measurement Conditions>
Solvent: 1,2,4-trichlorobenzene
Measurement temperature: 145° C.
Flow rate: 1.0 mL/min
Sample concentration: 2.2 mg/mL
Injection amount: 160 μL
Calibration curve: Universal Calibration
Analysis software: HT-GPC (ver. 1.0)

(Production Method for Amorphous Polyolefin)

Examples of the production method for the amorphous polyolefin to be used in the present invention include a production method for a propylene homopolymer or a 1-butene homopolymer by homopolymerization of propylene or 1-butene using a metallocene catalyst and a production method for a 1-butene-propylene copolymer by copolymerization of 1-butene and propylene (further an α-olefin having 5 to 20 carbon atoms to be used as needed) using a metallocene catalyst in the same manner as the production method for the crystalline polyolefin described above.

Examples of the metallocene-based catalyst include catalysts obtained by combining a transition metal compound containing one or two ligands selected from a cyclopentadienyl group, a substituted cyclopentadienyl group, an indenyl group, a substituted indenyl group, and the like as described in JP-A 58-19309, JP-A 61-130314, JP-A 3-163088, JP-A 4-300887, JP-A 4-211694, JP-T 1-502036, and the like, or a transition metal compound, in which the above ligand is geometrically controlled, with a promoter.

[Tackifier]

The adhesive composition of the present invention may contain the crystalline polyolefin of the present invention and a tackifier.

Examples of the tackifier include materials which are composed of a rosin derivative resin, a polyterpene resin, a petroleum resin, an oil-soluble phenolic resin, or the like and are in the form of a solid, a semi-solid, or a liquid at normal temperature. Among these materials, one type may be used alone or two or more types may be used in combination. In the present invention, in consideration of the compatibility with a butene-based polymer, it is preferred to use a hydrogenated material. In particular, a hydrogenated petroleum resin material having excellent heat stability is more preferred.

Examples of commercially available products of the tackifier include I-MARV P-125, I-MARV P-100, and I-MARV P-90 (all manufactured by Idemitsu Kosan Co., Ltd.), Yumex 1001 (manufactured by Sanyo Chemical Industries, Ltd.), Hi-Rez T 1115 (manufactured by Mitsui Chemicals, Incorporated), Clearon K 100 (manufactured by Yasuhara Chemical Co., Ltd.), ECR 227 and Escorez 2101 (both manufactured by Tonex Co., Ltd.), Arkon P-100 (manufactured by Arakawa Chemical Industries, Ltd.), and Regalrez 1078 (manufactured by Hercules, Inc.) (all are trade names).

From the viewpoint of the balance between the improvement of the adhesiveness and the residual glue, the content of the tackifier in the adhesive composition of the present invention is preferably 0% by mass or more and 50% by mass or less, more preferably 5% by mass or more and 50% by mass or less, further more preferably 10% by mass or more and 30% by mass or less.

[Other Components]
(Solvent)

The adhesive composition of the present invention may contain a solvent. Specific examples of the solvent include organic solvents such as ethyl acetate, acetone, tert-butyl alcohol, glycerin, ethylene glycol, triethylene glycol, ethylene glycol monomethyl ether, ethylene glycol monomethyl ether acetate, diethylene glycol dimethyl ether, ethylene glycol dimethyl ether acetate, ethyl cellosolve, ethyl cellosolve acetate, butyl cellosolve, butyl cellosolve acetate, etc., and aromatic hydrocarbons such as benzene, toluene, xylene, ethylbenzene, methoxybenzene, 1,2-dimethoxybenzene, hexane, cyclohexane, heptane, and pentane.

(Additive)

The adhesive composition of the present invention may contain an additive.

As the additive, a conventionally known additive can be blended in the adhesive composition within a range in which the effect of the present invention is not inhibited, and examples thereof include a foaming agent, a weather resistant stabilizer, a UV absorbent, a light stabilizer, a heat resistant stabilizer, an antistatic agent, a flame retardant, a synthetic oil, a wax, an electrical property improving agent, an oil (process oil), a viscosity modifier, an anti-coloring agent, an antifogging agent, a pigment, a dye, a plasticizer, a softening agent, an anti-aging agent, a hydrochloric acid absorbent, a chlorine scavenger, and an antioxidant.

(Thermoplastic Elastomer)

The adhesive composition of the present invention may contain a thermoplastic elastomer. Since many of the thermoplastic elastomers have a high viscosity, the content of the thermoplastic elastomer in the adhesive composition of the present invention is preferably 0% by mass or more and 50% by mass or less, more preferably 0% by mass or more and 45% by mass or less, further more preferably 0% by mass or more and 40% by mass or less from the viewpoint of the coatability. The glass transition temperature of the thermoplastic elastomer is preferably 50° C. or higher and 150° C. or lower, more preferably 80° C. or higher and 150° C. or lower from the viewpoint of the improvement of the holding strength.

Specific examples of the thermoplastic elastomer include an ethylene-vinyl acetate copolymer, acrylic rubber, natural rubber (NR), isoprene rubber (IR), styrene-butadiene rubber (SBR), chloroprene rubber (CR), butyl rubber (IIR), ethylene-propylene rubber (EPM, EPDM), a polyisobutylene, a styrene-ethylene-butylene-styrene copolymer (SEBS), an acrylonitrile-butadiene copolymer (NBR), a styrene-butadiene-styrene block copolymer (SBS), a styrene-isoprene-styrene block copolymer (SIS), and a polyvinyl alkyl ether (for example, polyvinyl isobutyl ether). Among the thermoplastic elastomers, one type may be used alone or two or more types may be used in combination.

[Physical Properties of Adhesive Composition]

(Storage Elastic Modulus at 25° C.)

The adhesive composition of the present invention has a storage elastic modulus (E') at 25° C. obtained from the solid viscoelasticity measurement of the composition of 1 MPa or more and 200 MPa or less. A higher elastic modulus indicates a harder material. If the storage elastic modulus E' at 25° C. (around room temperature) is too low, the holding strength is lacking and also residual glue is left, while on the other hand, if the storage elastic modulus is too high, the adhesive strength and tackiness are lacking. Here, 25° C. is a temperature when the adhesive composition is used as an adhesive tape, and if the adhesive composition is too hard at this temperature, the adhesive tape is not adhered, and therefore, in the present invention, the adhesive composition is required to be a soft material having a storage elastic modulus E' of 200 MPa or less. On the other hand, if the adhesive composition is too soft, residual glue is left, and therefore, in the present invention, the adhesive composition is required to be a moderately soft material having a storage elastic modulus E' of 1 MPa or more.

From this point of view, the storage elastic modulus at 25° C. of the adhesive composition is preferably 3 MPa or more and 100 MPa or less, more preferably 5 MPa or more and 80 MPa or less.

(Storage Elastic Modulus at 50° C.)

The adhesive composition of the present invention has a storage elastic modulus (E') at 50° C. obtained from the solid viscoelasticity measurement of the composition of 1 MPa or more and 100 MPa or less. If the storage elastic modulus E' at 50° C. (high temperature) is too low, the holding strength at high temperatures is lacking and also residual glue is left, while on the other hand, if the storage elastic modulus is too high, the adhesive strength and tackiness are lacking. Here, 50° C. is a temperature which the adhesive composition should withstand as an adhesive tape, and the adhesive composition is required to be moderately soft at this temperature.

From this point of view, the storage elastic modulus at 50° C. of the adhesive composition is preferably 1 MPa or more and 80 MPa or less, more preferably 3 MPa or more and 60 MPa or less.

Ideally, it is preferred that the storage elastic modulus at 25° C. is comparable to the storage elastic modulus at 50° C., and the storage elastic modulus does not vary in any temperature range.

The solid viscoelasticity measurement in the present invention is carried out by the following method.

The measurement is carried out in a nitrogen atmosphere under the following conditions using a viscoelasticity measuring device (manufactured by SII Nano Technology, Inc., trade name: DMS 6100 (EXSTAR 6000)).

(Measurement Conditions)

Measurement mode: tensile mode

Measurement temperature: the measurement is carried out at the following two temperatures: 25° C. and 50° C. in the range from −150° C. to 230° C.

Temperature rising rate: 5° C./min

Measurement frequency: 1 Hz

Sample size: length: 10 mm, width: 4 mm, thickness: 1 mm (press-molded product)

(Use)

The adhesive composition of the present invention can be preferably used for an adhesive tape and a protect film.

<Adhesive Tape>

The adhesive tape of the present invention is configured such that the adhesive composition described above is used in an adhesive layer. The adhesive composition may be directly coated onto a support, or may be painted on an auxiliary support and transferred onto a final support. The material of the support is not particularly limited, but for example, a fabric, a knit, a scrim, a non-woven cloth, a laminate, a net, a film, a paper, a tissue paper, a foamed body, a foamed film, or the like can be used. Examples of the film include polypropylene, polyethylene, polybutene, oriented polyester, hard PVC and soft PVC, a polyolefin foamed body, a polyurethane foamed body, EPDM, and a chloroprene foamed body.

The support can be prepared by a chemical pretreatment with a priming coat or a physical pretreatment with corona discharge or the like before it is fitted with the adhesive composition. The rear surface of the support can be subjected to an anti-adhesive physical treatment or coating.

EXAMPLES

Next, the present invention will be more specifically described with reference to Examples, but the present invention is by no means limited thereto.

Synthesis Example 1

Production of Complex A ((1,1'-ethylene)(2,2'-tetramethyldisilylene)bisindenylzirconium dichloride)

Magnesium (12 g, 500 mmol) and tetrahydrofuran (30 mL) were put into a 500-mL two-necked flask, and 1,2-dibromoethane (0.2 mL) was added dropwise thereto to activate magnesium. 2-Bromoindene (20 g, 103 mmol) dissolved in tetrahydrofuran (150 mL) was added dropwise thereto, followed by stirring at room temperature for 1 hour. Subsequently, 1,2-dichlorotetramethyldisilane (9.4 mL, 5.1 mmol) was added dropwise thereto at 0° C. After the reaction mixture was stirred at room temperature for 1 hour, the solvent was evaporated off, and the residue was extracted with hexane (150 mL, twice), whereby 1,2-di(1H-inden-2-yl)-1,1,2,2-tetramethyldisilane was obtained as a white solid (15.4 g, 44.4 mmol, yield: 86%).

This solid was dissolved in diethyl ether (100 mL), then n-butyllithium (2.6 mol/L, 38 mL, 98 mmol) was added dropwise thereto at 0° C., followed by stirring at room temperature for 1 hour, resulting in precipitation of a white powder. The supernatant was removed, and the solid was washed with hexane (80 mL), whereby a lithium salt was obtained as a white powdery solid (14.6 g, 33.8 mmol, 76%).

This solid was dissolved in tetrahydrofuran (120 mL), and 1,2-dibromoethane (2.88 mL, 33.8 mmol) was added dropwise thereto at −30° C. The reaction mixture was stirred at room temperature for 1 hour, followed by evaporation to dryness, and the residue was extracted with hexane (150 mL), whereby a double-crosslinked ligand was obtained as a colorless oily liquid (14.2 g, 37.9 mmol).

This liquid was dissolved in diethyl ether (120 mL), and n-butyllithium (2.6 mol/L, 32 mL, 84 mmol) was added dropwise thereto at 0° C., followed by stirring at room temperature for 1 hour, resulting in precipitation of a white powder. The supernatant was removed, and the solid was washed with hexane (70 mL), whereby a lithium salt of the double-crosslinked ligand was obtained as a white powder (14.0 g, 31 mmol, yield: 81%).

A toluene (30 mL) suspension of zirconium tetrachloride (1.52 g, 6.54 mmol) was added dropwise at −78° C. to a toluene (30 mL) suspension of the obtained lithium salt of the double-crosslinked ligand (3.00 g, 6.54 mmol) through a cannula. The reaction mixture was stirred at room temperature for 2 hours, then the supernatant was separated, and further the residue was extracted with toluene.

Under reduced pressure, the supernatant and the solvent of the extract were evaporated off to dryness, whereby (1,1'-ethylene)(2,2'-tetramethyldisilylene)bisindenylzirconium dichloride represented by the following formula (1) was obtained as a yellow solid (2.5 g, 4.7 mmol, yield: 72%).

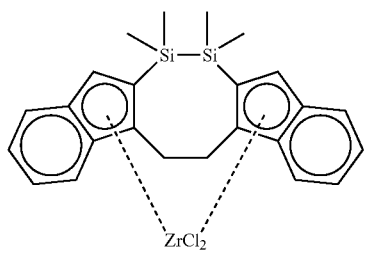

(1)

The measurement results of $^1$H-NMR are shown below.
$^1$H-NMR (CDCl$_3$): δ 0.617 (s, 6H, —SiMe$_2$-), 0.623 (s, 6H, —SiMe$_2$-), 3.65-3.74, 4.05-4.15 (m, 4H, CH$_2$CH$_2$), 6.79 (s, 2H, CpH), 7.0-7.5 (m, 8H, Aromatic-H)

Synthesis Example 2

Complex B (dimethylsilylenebis(2-methylbenzindenyl) zirconium dichloride)

The following compound (dimethylsilylenebis(2-methylbenzindenyl) zirconium dichloride) was synthesized according to the description of the literature (Organometallics, 1994, 13, 954).

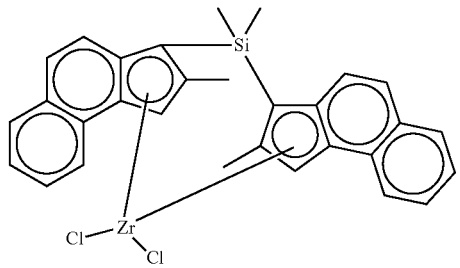

Synthesis Example 3

Complex C ((1,2'-dimethylsilylene) (2,1'-dimethylsilylene)-bis(3-trimethylsilylmethylindenyl) zirconium dichloride)

(1,2'-Dimethylsilylene) (2,1'-dimethylsilylene)-bis(3-trimethylsilylmethylindenyl)zirconium dichloride) was synthesized according to the description in Reference Example 1 of Japanese Patent No. 4053993.

Synthesis Example 4

Complex D ((1,2'-dimethylsilylene)(2',1-dimethylsilylene)bis(3-neopentylindenyl)zirconium dichloride)

Into a Schlenk bottle, 5.0 g (14.5 mmol) of (1,2'-dimethylsilylene)(2',1-dimethylsilylene)bis(indene) and 40 mL of ether were put, and 12.0 mL of n-BuLi (a hexane solution, 2.69 M) was added dropwise thereto at 0° C., and then, the temperature was raised to room temperature as such, and the mixture was stirred for 8 hours. The precipitate was separated by filtration, washed with 30 mL of hexane and dried under reduced pressure, whereby a lithium salt was obtained as a white solid. This solid was dissolved in 40 mL of THF, then 4.9 mL (36.6 mmol) of 1-iodo-2,2-dimethylpropane was added dropwise thereto, and the resulting mixture was heated to reflux for 4 hours. After hydrolysis with 20 mL of water, the organic layer was separated, dried, and the solvent was evaporated off, whereby 7.1 g (14.7 mmol) of (1,2'-dimethylsilylene)(2',1-dimethylsilylene)bis(3-neopentylindene) was obtained as a light orange oily substance.

Subsequently, in a nitrogen stream, 7.1 g (14.7 mmol) of (1,2'-dimethylsilylene)(2',1-dimethylsilylene)bis(3-neopentylindene) and 40 mL of ether were added to a Schlenk bottle. The resulting mixture was cooled to 0° C., and 12.0 mL (32.3 mmol) of n-BuLi (a hexane solution, 2.69 M) was added thereto, followed by stirring at room temperature for 2 hours. The supernatant was separated by filtration, and the obtained solid was washed with 40 mL of hexane and dried, whereby a lithium salt was obtained.

To the thus obtained lithium salt, 50 mL of toluene was added and cooled to −78° C., and a toluene suspension of 3.4 g (14.7 mmol) of zirconium tetrachloride previously cooled to −78° C. was added thereto. The resulting mixture was stirred at room temperature for 8 hours, the supernatant was separated by filtration, and the resulting yellow precipitate was extracted with 65 mL of dichloromethane, followed by filtration. Then, the solvent was evaporated off, whereby 0.7 g (1.1 mmol) of (1,2'-dimethylsilylene)(2',1-dimethylsilylene)bis(3-neopentylindenyl)zirconium dichloride was obtained.

$^1$H-NMR (CDCl$_3$): δ 0.99 (6H, SiMe$_2$), 1.06 (6H, SiMe$_2$), 0.85 (18H, C(CH$_3$)$_3$), 2.50, 3.02 (4H, CH$_2$), 7.1-7.5 (8H, Aromatic-H)

Synthesis Example 5

Complex E ((1,2'-Ph$_2$Si)(2',1-Ph$_2$Si)bis(indenyl) zirconium dichloride)

Bis(2-indenyl)diphenylsilane was synthesized in accordance with the method described in the literature (SYNTHESIS, 2006, 9, 1408).

To 7.64 g (18.5 mmol) of bis(2-indenyl)diphenylsilane, 100 mL of ether was added and cooled to 0° C., and 13.8 mL of n-BuLi (a hexane solution, 2.69 M) was added dropwise thereto. After the resulting mixture was stirred at room temperature for 4 hours, the resulting white precipitate was separated by filtration and dried. This white solid was dissolved in 70 mL of THF, and the resulting solution was cooled in an ice bath. Then, 3.6 mL (17.3 mmol) of diphenyldichlorosilane was added dropwise thereto using a syringe. The reaction mixture was returned to room temperature, and a Dimroth condenser tube was attached to the reaction vessel, and the reaction mixture was heated to reflux for 7 hours. Then, the reaction mixture was returned to room temperature, and the resulting white precipitate was separated by filtration, and then dried, whereby 3.26 g (5.5 mmol) of (1,2'-Ph$_2$Si)—(2',1-Ph$_2$Si)bis(indene) was obtained.

Then, 20 mL of ether and 20 mL of THF were added thereto, and cooled to −78° C. Subsequently, 4.1 mL of n-BuLi (a hexane solution, 2.69 M) was added dropwise thereto, followed by stirring at room temperature for 2 hours. The resulting white solid was separated by filtration, and dried under reduced pressure. To this white solid, 25 mL of toluene was added and cooled to −78° C., and 15 mL of a toluene suspension of 1.3 g (5.5 mmol) of zirconium tetrachloride separately cooled to −78° C. was added thereto. After the resulting mixture was stirred at room temperature for 8 hours, the supernatant was separated by filtration, and the resulting yellow precipitate was extracted with 30 mL of dichloromethane. The extract was concentrated, whereby (1,2'-Ph$_2$Si)(2',1-Ph$_2$Si)bis(indenyl)zirconium dichloride was obtained as a yellow solid.

$^1$H-NMR (CDCl$_3$): δ 6.74-7.82 (30H, Aromatic-H)

Production Example 1

Heptane (400 mL), triisobutylaluminum (0.5 mmol), N,N-dimethylanilinium tetrakis(pentafluorophenyl)borate (0.8 μmol), and the complex D (0.2 μmol) were put into a one-liter autoclave that had been dried by heating, and further, 0.05 MPa of hydrogen was introduced thereinto, and also propylene was introduced thereinto so that the total pressure was increased to 0.8 MPa and polymerization was carried out at 70° C. for 30 minutes. After completion of the polymerization reaction, the reaction product was dried under reduced pressure, whereby 90 g of a crystalline propylene homopolymer (polymer a) was obtained.

[$^{13}$C-NMR Measurement]

With respect to the thus obtained polymer a, the $^{13}$C-NMR spectrum was measured using the following device under the following conditions, and the meso pentad fraction (mmmm), the meso diad fraction (m), the 1,3-bond fraction, the 1,4-bond fraction, and the 2,1-bond fraction were determined. The results are shown in Table 1.

Device: $^{13}$C-NMR spectrometer, JNM-EX400 series manufactured by JEOL, Ltd.
Method: proton complete decoupling method
Concentration: 230 mg/mL
Solvent: a mixed solvent of 1,2,4-trichlorobenzene and deuterated benzene at 90:10 (volume ratio)
Temperature: 130° C.
Pulse width: 45°
Pulse repetition time: 4 seconds
Accumulation: 10,000 times The respective structural units in the 1-butene-propylene copolymer were calculated as follows based on the results of the above-mentioned measurement of the $^{13}$C-NMR spectrum.

[Diad Chain Strength]
a (propylene-propylene chain): value of integral at 48.0 to 46.2 ppm
b (propylene-butene chain): value of integral at 44.4 to 43.0 ppm
c (butene-butene chain): value of integral at 40.8 to 39.8 ppm

[Diad Chain Fraction (mol %)]
d (propylene-propylene chain fraction)=a/(a+b+c)×100 (mol %)
e (propylene-butene chain fraction)=b/(a+b+c)×100 (mol %)
f (butene-butene chain fraction)=c/(a+b+c)×100 (mol %)

[Copolymerization Ratio (mol %)]
propylene unit copolymerization ratio=d+e/2
1-butene unit copolymerization ratio=f+e/2

Further, the meso diad fraction (m) was calculated according to the following formula based on the results of the above-mentioned measurement of the $^{13}$C-NMR spectrum.

Meso diad fraction (m)=(value of integral at 40.4 to 39.9 ppm)/(value of integral at 40.4 to 39.9 ppm+value of integral at 40.7 to 40.4 ppm)

Further, the 1,3-bond fraction, the 1,4-bond fraction, and the 2,1-bond fraction were calculated according to the following formulae based on the results of the above-mentioned measurement of the $^{13}$C-NMR spectrum.

<In the Case of Propylene-Based Polymer>

$$1,3\text{-bond fraction}=(D/2)/(A+B+C+D)\times 100 \text{ (mol \%)}$$

$$2,1\text{-bond fraction}=[(A+B)/2]/(A+B+C+D)\times 100 \text{ (mol \%)}$$

A: value of integral at 15 to 15.5 ppm
B: value of integral at 17 to 18 ppm
C: value of integral at 19.5 to 22.5 ppm
D: value of integral at 27.6 to 27.8 ppm <In the Case of 1-Butene-Based Polymer>

$$1,4\text{-bond fraction}=E/(A+B+C+D+E)\times 100 \text{ (mol \%)}$$

$$2,1\text{-bond fraction}=\{(A+B+D)/3\}/(A+B+C+D)\times 100 \text{ (mol \%)}$$

A: value of integral at 29.0 to 28.2 ppm
B: value of integral at 35.4 to 34.6 ppm
C: value of integral at 38.3 to 36.5 ppm
D: value of integral at 43.6 to 42.8 ppm
E: value of integral at 31.1 ppm

[DSC Measurement]

With respect to the polymer a, by using a differential scanning calorimeter (manufactured by PerkinElmer Co., Ltd., trade name: DSC-7), 10 mg of a sample was kept in a nitrogen atmosphere at −10° C. for 5 minutes, and then the temperature was raised at 10° C./min to determine the melting endothermic amount as ΔH (J/g). Further, the top of a peak observed on the highest temperature side in a melting endothermic curve obtained at this time was determined as the melting point Tm (° C.). The results are shown in Table 1.

[GPC Measurement]

With respect to the polymer a, according to the gel permeation chromatography (GPC) method, the weight-average molecular weight (Mw) and the molecular weight distribution (Mw/Mn) were determined. In the measurement, the following device was used under the following conditions, and the weight-average molecular weight in terms of polystyrene was obtained. The results are shown in Table 1.

<GPC Measuring Device>
 Column: TOSO GMHHR-H(S)HT
 Detector: RI detector for liquid chromatography, Waters 150C
<Measurement Conditions>
 Solvent: 1,2,4-trichlorobenzene
 Measurement temperature: 145° C.
 Flow rate: 1.0 mL/min
 Sample concentration: 2.2 mg/mL
 Injection amount: 160 μL
 Calibration curve: Universal Calibration
 Analysis software: HT-GPC (ver. 1.0)

[Limiting Viscosity (η)]

With respect to the polymer a, 0.02 to 0.16 g/dL solutions were subjected to measurement at 135° C. using a viscometer (manufactured by RIGO Co., Ltd., trade name: "VMR-053U-PC•F01"), an Ubbelohde type viscosity tube (bulb volume in measurement: 2 to 3 mL, capillary diameter: 0.44 to 0.48 mm), and tetralin as the solvent. The results are shown in Table 1.

Production Example 2

85 g of a crystalline propylene homopolymer (polymer b) was obtained in the same manner as in Production Example 1 except that the polymerization temperature in Production Example 1 was changed to 65° C. The physical properties of the polymer b were measured in the same manner as in Production Example 1. The results are shown in Table 1.

Production Example 3

84 g of a crystalline propylene homopolymer (polymer c) was obtained in the same manner as in Production Example 1 except that the complex E was used in place of the complex D in Production Example 1. The physical properties of the polymer c were measured in the same manner as in Production Example 1. The results are shown in Table 1.

Production Example 4

80 g of a crystalline propylene homopolymer (polymer d) was obtained in the same manner as in Production Example 3 except that the polymerization temperature in Production Example 3 was changed to 65° C. The physical properties of the polymer d were measured in the same manner as in Production Example 1. The results are shown in Table 1.

Production Example 5

Production of Amorphous 1-Butene Homopolymer

Heptane (200 mL), triisobutylaluminum (2 M, 0.2 mL, 0.4 mmol), butene-1 (200 mL), a heptane slurry of the complex A (10 mol/mL, 0.20 mL, 2.0 μmol), and MAO (2000 μmol) manufactured by Tosoh Finechem Corporation were put into a one-liter autoclave that had been dried by heating, and further, 0.1 MPa of hydrogen was introduced thereinto. After the temperature was raised to 70° C. while stirring, polymerization was carried out for 30 minutes. After completion of the polymerization reaction, the polymerization was stopped with 5 mL of ethanol, and the reaction product was dried under reduced pressure, whereby 82 g of an amorphous 1-butene homopolymer (polymer e) was obtained. The physical properties of the polymer e were measured in the same manner as in Production Example 1. The results are shown in Table 1.

Production Example 6

Production of Amorphous 1-Butene-Propylene Copolymer

Heptane (300 mL), triisobutylaluminum (2 M, 0.2 mL, 0.4 mmol), butene-1 (60 mL), a heptane slurry of the complex C (10 μmol/mL, 0.02 mL, 0.2 μmol), and a heptane slurry of N,N-dimethylanilinium tetrakis(pentafluorophenyl)borate (10 μmol/mL, 0.06 mL, 0.6 μmol) were put into a one-liter autoclave that had been dried by heating, and further, 0.05 MPa of hydrogen was introduced thereinto. The temperature was raised to 60° C. while stirring, and simultaneously, propylene was introduced thereinto so that the total pressure was increased to 0.8 MPa. Then, after polymerization was carried out for 20 minutes, the polymerization was stopped with 5 mL of ethanol, and the reaction product was dried under reduced pressure, whereby 57 g of an amorphous 1-butene-propyelene copolymer (polymer f) was obtained. The physical properties of the polymer f were measured in the same manner as in Production Example 1. The results are shown in Table 1.

Production Example 7

Production of Amorphous Propylene Homopolymer

Heptane (400 mL), triisobutylaluminum (2 M, 0.2 mL, 0.4 mmol), the complex A (10 mol/mL, 0.20 mL, 2.0 μmol), and MAO (2000 mol) manufactured by Tosoh Finechem Corporation were put into a one-liter autoclave that had been dried by heating, and further, 0.1 MPa of hydrogen was introduced thereinto. Then, propylene was charged thereinto while stirring so that the total pressure was increased to 0.7 MPa, and polymerization was carried out at 50° C. for 60 minutes. After completion of the polymerization reaction, propylene and hydrogen were removed to depressurize the system, and the polymerization liquid was heated and dried under reduced pressure, whereby 105 g of an amorphous propylene homopolymer (polymer g) was obtained. The physical properties of the polymer g were measured in the same manner as in Production Example 1. The results are shown in Table 1.

Production Example 8

(1) Preparation of Solid Catalyst Component

A three-necked flask having an internal volume of 0.5 L and equipped with a stirrer was purged with nitrogen gas, and then 20 mL of dehydrated heptane, 4 g of diethoxymagnesium, and 1.6 g of dibutyl phthalate were added thereto, and 4 mL of titanium tetrachloride was added dropwise thereto while keeping the system at 90° C. and stirring. Further, 111 mL of titanium tetrachloride was added dropwise thereto and the temperature was raised to 110° C. 115 mL of titanium tetrachloride was added to the resulting solid phase, and further reacted at 110° C. for 2 hours. After completion of the reaction, the resulting product was washed several times with 100 mL of purified heptane, whereby a solid catalyst component was obtained.

(2) Preparation of Prepolymerized Catalyst Component

A three-necked flask having an internal volume of 0.5 L and equipped with a stirrer was purged with nitrogen gas, and then 300 mL of dehydrated heptane, and 10 g of the solid catalyst component prepared in the above (1) were added thereto. The temperature in the system was set to 15° C., and then 4.2 mmol of triethylaluminum and 1.1 mmol of cyclohexylmethyldimethoxysilane (CHMDS) were added thereto, and propylene was introduced thereinto while stirring. After 2 hours, the stirring was stopped, and as a result, a prepolymerized catalyst component in which propylene was polymerized in an amount of 2 g per g of the solid catalyst component was obtained.

(3) Synthesis of Propylene Polymer

A stainless steel autoclave having an internal volume of 10 L and equipped with a stirrer was fully dried and purged with nitrogen, and then 2 kg of propylene, 6 mmol of triethylaluminum, and 3.0 mmol of dicyclopentyldimethoxysilane (DCPDS) were added thereto and the temperature was raised to 65° C. Subsequently, 0.12 g of the prepolymerized catalyst component prepared in the above (2) was put thereinto, and polymerization was carried out at 70° C. for 3 hours. As a result, 960 g of a crystalline propylene homopolymer powder (polymer h) was obtained. The physical properties of the polymer h were measured in the same manner as in Production Example 1. The results are shown in Table 1.

TABLE 1

| | Production Example 1 | Production Example 2 | Production Example 3 | Production Example 4 | Production Example 5 | Production Example 6 | Production Example 7 | Production Example 8 |
|---|---|---|---|---|---|---|---|---|
| | Polymer a Crystalline PP | Polymer b Crystalline PP | Polymer c Crystalline PP | Polymer d Crystalline PP | Polymer e Amorphous PB | Polymer f Amorphous PB-PP copolymer | Polymer g Amorphous PP | Polymer h Crystalline PP |
| [mmmm] (mol %) | 51.0 | 52.0 | 55 | 57.0 | 5.8 | — | 6.1 | 98.5 |
| COBB [m] (mol %) | — | — | — | — | — | 72.9 | — | — |
| 1,3-bond fraction and 1,4-bond fraction (mol %) | less than 0.1 | less than 0.1 | less than 0.1 | less than 0.1 | less than 0.1 | less than 0.1 | less than 0.1 | less than 0.1 |
| 2,1-bond fraction (mol %) | less than 0.1 | less than 0.1 | less than 0.1 | less than 0.1 | less than 0.1 | less than 0.1 | less than 0.1 | less than 0.1 |
| Tm (° C.) | 89.0 | 89.0 | 95 | 97 | not observed | not observed | not observed | 161 |
| ΔH (J/g) | 30.0 | 30 | 41 | 44.0 | not observed | not observed | not observed | 95 |
| Limiting viscosity [η] (dl/g) | 0.40 | 0.52 | 0.21 | 0.27 | 0.26 | 0.89 | 0.58 | 1.20 |
| Mw | 41,300 | 55,100 | 21,500 | 28,500 | 34,500 | 131,100 | 62,000 | 132,500 |
| Mw/Mn | 1.9 | 1.9 | 1.9 | 1.9 | 2.0 | 1.9 | 2.5 | 2.7 |
| Propylene content (mol %) | 100 | 100 | 100 | 100 | 0 | 19 | 100 | 100 |

Example 1

Production of Adhesive Composition and Adhesive Tape 7.0 g of the polymer e produced in Production Example 5 and 3.0 g of the polymer a produced in Production Example 1 were put into a 50-mL sample bottle, and melted by heating at 180° C. for 30 minutes, and then fully mixed and stirred with a metal spoon, whereby an adhesive composition was prepared.

The thus obtained adhesive composition was sandwiched between a PET film (manufactured by Toray Industries, Inc., trade name: Lumirror S10, thickness: 50 m) for use as a base material and a PET film for releasing, and coated with a hot roll coater heated to 110° C. so that the thickness of an adhesive layer was about 30 μm. Then, the PET film for releasing was peeled off, and the state was stabilized at room temperature for one day, whereby a test piece of an adhesive tape was obtained.

[Solid Viscoelasticity Measurement]

The measurement was carried out in a nitrogen atmosphere under the following conditions using a viscoelasticity measuring device (manufactured by SII Nano Technology, Inc., trade name: DMS 6100 (EXSTAR 6000)).

<Measurement Conditions>

Measurement mode: tensile mode

Measurement temperature: the measurement was carried out at the following two temperatures: 25° C. and 50° C. in the range from −150° C. to 230° C.

Temperature rising rate: 5° C./min
Measurement frequency: 1 Hz
Sample size: length: 10 mm, width: 4 mm, thickness: 1 mm (press-molded product)

[Evaluation of Adhesive Strength and Residual Glue]

The evaluation of the adhesive strength was carried out according to JIS Z 0237. An adhesive tape having an adhesive layer formed thereon was bonded to a PET film (manufactured by Toray Industries, Inc., trade name: Lumirror S10, thickness: 50 μm) for use as an adherend, and cut into a size with a width of 25 mm and a length of 200 mm. Then, a force of 2.0 kg/25 mm was applied twice to the bonded portion with a rubber roller, whereby the tape and the film were bonded to each other. At measurement temperatures of 0° C. and 23° C., a T-peel test was carried out by setting the initial length $L_0$ to 120 mm and pulling the test piece at a rate of 300 mm/min using a tensile tester (manufactured by Shimadzu Corporation, trade name: Autograph AG-I). Five average loads were selected during the peel test, and the average thereof was determined as the adhesive strength. Further, in the case where slip stick or zipping occurs during the peel test, a variation in stress is increased, and therefore, the average of the fourth largest and smallest values was determined as the adhesive strength. The results are shown in Table 2.

Further, the presence or absence of residual glue on the adherend after the evaluation of the adhesive strength was visually observed. The results are shown in Table 2.

[Measurement of Holding Strength]

The measurement of the holding strength was carried out according to JIS Z 0237. An adhesive tape having an adhesive layer formed thereon was bonded to a PET film (manufactured by Toray Industries, Inc., trade name: Lumirror S10, thickness: 50 μm) for use as an adherend such that the bonded area had a size of 25 mm×25 mm. Then, a force of 2.0 kg/25 mm was applied twice to the bonded portion with a rubber roller, whereby the tape and the film were bonded to each other. A 1-kg weight was hung from the thus obtained test piece in an environment at a temperature of 50° C. and a humidity of 30%, and the time when the weight dropped from the adherend was measured. The results are shown in Table 2.

Example 2

An adhesive composition and a test piece of an adhesive tape were obtained in the same manner as in Example 1 except that the polymer f produced in Production Example 6 was used in place of the polymer e in Example 1. The evaluation results of the test piece are shown in Table 2.

Example 3

1.5 g of the polymer e produced in Production Example 5, 7.0 g of the polymer a produced in Production Example 1, and 1.5 g of a process oil (manufactured by Idemitsu Kosan Co., Ltd., trade name: Diana Process Oil PW-90) were put into a 50-mL sample bottle, and melted by heating at 180° C. for 30 minutes, and then fully mixed and stirred with a metal spoon, whereby an adhesive composition was prepared. The evaluation results of a test piece are shown in Table 2.

A test piece of an adhesive tape was obtained in the same manner as in Example 1 except that the obtained adhesive composition was used. The evaluation results of the test piece are shown in Table 2.

Example 4

An adhesive composition and a test piece of an adhesive tape were obtained in the same manner as in Example 2 except that the polymer g produced in Production Example 7 was used in place of the polymer f in Example 2. The evaluation results of the test piece are shown in Table 2.

Example 5

An adhesive composition and a test piece of an adhesive tape were obtained in the same manner as in Example 4 except that the polymer b produced in Production Example 2 was used in place of the polymer a in Example 4. The evaluation results of the test piece are shown in Table 2.

Example 6

An adhesive composition and a test piece of an adhesive tape were obtained in the same manner as in Example 4 except that the polymer c produced in Production Example 3 was used in place of the polymer a in Example 4. The evaluation results of the test piece are shown in Table 2.

Example 7

An adhesive composition and a test piece of an adhesive tape were obtained in the same manner as in Example 4 except that the polymer d produced in Production Example 4 was used in place of the polymer a in Example 4. The evaluation results of the test piece are shown in Table 2.

Example 8

9.0 g of the polymer a produced in Production Example 1, 3.0 g of a tackifier (manufactured by Idemitsu Kosan Co., Ltd., trade name: I-MARV P-100), and 1.5 g of a process oil (manufactured by Idemitsu Kosan Co., Ltd., trade name: Diana Process Oil PW-90) were put into a 50-mL sample bottle, and melted by heating at 180° C. for 30 minutes, and then fully mixed and stirred with a metal spoon, whereby an adhesive composition was prepared. The evaluation results of a test piece are shown in Table 2.

A test piece of an adhesive tape was obtained in the same manner as in Example 1 except that the obtained adhesive composition was used. The evaluation results of the test piece are shown in Table 2.

Comparative Example 1

An adhesive composition and a test piece of an adhesive tape were obtained in the same manner as in Example 1 except that the blending amount of the polymer e in Example 1 was changed to 10.0 g, and the polymer a was not used. The evaluation results of the test piece are shown in Table 2.

Comparative Example 2

An adhesive composition and a test piece of an adhesive tape were obtained in the same manner as in Example 1 except that a tackifier (manufactured by Idemitsu Kosan Co., Ltd., trade name: I-MARV P-100) was used in place of the polymer a in Example 1. The evaluation results of the test piece are shown in Table 2.

Comparative Example 3

An adhesive composition and a test piece of an adhesive tape were obtained in the same manner as in Comparative Example 1 except that the polymer g produced in Production Example 7 was used in place of the polymer e in Comparative Example 1. The evaluation results of the test piece are shown in Table 2.

Comparative Example 4

An adhesive composition and a test piece of an adhesive tape were obtained in the same manner as in Example 4 except that the polymer h produced in Production Example 8 was used in place of the polymer a in Example 4. The evaluation results of the test piece are shown in Table 2.

TABLE 2

|  |  | Example 1 | Example 2 | Example 3 | Example 4 | Example 5 | Example 6 |
|---|---|---|---|---|---|---|---|
| Polymer a Crystalline PP | parts by mass | 30 | 30 | 70 | 30 | — | — |
| Polymer b Crystalline PP | parts by mass | — | — | — | — | 30 | — |
| Polymer c Crystalline PP | parts by mass | — | — | — | — | — | 30 |
| Polymer d Crystalline PP | parts by mass | — | — | — | — | — | — |
| Polymer e Amorphous PB | parts by mass | 70 | — | 15 | — | — | — |
| Polymer f Amorphous PB-PP copolymer | parts by mass | — | 70 | — | — | — | — |
| Polymer g Amorphous PP | parts by mass | — | — | — | 70 | 70 | 70 |
| Polymer h Crystalline PP | parts by mass | — | — | — | — | — | — |
| Tackifier I-MARV P-100 | parts by mass | — | — | — | — | — | — |
| Process oil Diana Process Oil PW90 | parts by mass | — | — | 15 | — | — | — |
| Solid viscoelasticity E' (25° C.) | MPa | 10 | 15 | 180 | 15 | 17 | 40 |
| Solid viscoelasticity E' (50° C.) | MPa | 3 | 10 | 95 | 6 | 7 | 22 |
| Adhesive strength at 23° C. (Adherend PET) | N/cm | 3.65 | 3.50 | 1.00 | 3.01 | 2.83 | 2.02 |
| Residual glue at 23° C. | — | not left | not left | not left | not left | not left | not left |
| Adhesive strength at 0° C. (Adherend PET) | N/cm | 3.02 | 2.97 | 0.80 | 1.50 | 1.42 | 1.01 |
| Residual glue at 0° C. | — | not left | not left | not left | not left | not left | not left |
| Holding strength (Adherend PET, 1 kg, 50° C.) | min | 210 | 240 | 1400< | 280 | 310 | 450 |

|  | Example 7 | Example 8 | Comparative Example 1 | Comparative Example 2 | Comparative Example 3 | Comparative Example 4 |
|---|---|---|---|---|---|---|
| Polymer a Crystalline PP | — | 90 | — | — | — | — |
| Polymer b Crystalline PP | — | — | — | — | — | — |
| Polymer c Crystalline PP | — | — | — | — | — | — |
| Polymer d Crystalline PP | 30 | — | — | — | — | — |
| Polymer e Amorphous PB | — | — | 100 | 70 | — | — |
| Polymer f Amorphous PB-PP copolymer | — | — | — | — | — | — |
| Polymer g Amorphous PP | 70 | — | — | — | 100 | 70 |
| Polymer h Crystalline PP | — | — | — | — | — | 30 |
| Tackifier I-MARV P-100 | — | 30 | — | 30 | — | — |
| Process oil Diana Process Oil PW90 | — | 15 | — | — | — | — |
| Solid viscoelasticity E' (25° C.) | 44 | 80 | less than 1 | less than 1 | less than 1 | 380 |
| Solid viscoelasticity E' (50° C.) | 24 | 42 | less than 1 | less than 1 | less than 1 | 180 |
| Adhesive strength at 23° C. (Adherend PET) | 1.78 | 1.20 | 7.57 | 8.80 | 3.58 | cannot be coated |
| Residual glue at 23° C. | not left | not left | left | left | left |  |
| Adhesive strength at 0° C. (Adherend PET) | 0.89 | 0.40 | 4.54 | 5.28 | 1.87 |  |
| Residual glue at 0° C. | not left | not left | left | left | left |  |
| Holding strength (Adherend PET, 1 kg, 50° C.) | 480 | 500 | 3 | 3 | 4 |  |

In the case of Comparative Examples 1 and 3 in which only an amorphous polyolefin was used as the adhesive, and in the case of Comparative Example 2 in which a composition composed of an amorphous polyolefin and a tackifier was used as the adhesive, the storage elastic modulus of the composition at 25° C. and 50° C. was low, the holding strength was low, and also residual glue was left.

Further, in the case of Comparative Example 4 in which a crystalline polypropylene (polymer h) in which the meso pentad fraction mmmm is more than 60 mol % and the relationship between the limiting viscosity and the stereoregularity does not satisfy the above formula (i) was used, the coatability was largely deteriorated, and the composition could not be coated with a hot roll coater heated to 110° C. Incidentally, if the temperature of the hot roll coater is raised up to about 200° C., the composition can be coated, however, a PET film or an OPP film to be used as the base material is deformed or melted. Further, there is also a method in which the adhesive is dissolved in a solvent such as toluene and coated, however, the solubility of the crystalline polypropylene in a solvent is poor, and the coatability thereof is also poor even if this method is adopted.

On the other hand, in the case of Examples 1 to 8 in which a composition containing the crystalline polyolefin of the present invention was used as the adhesive, an adhesive base material which has high holding strength and leaves no residual glue could be provided.

INDUSTRIAL APPLICABILITY

The adhesive composition of the present invention can be utilized in the field of adhesive tapes and the like.

The invention claimed is:

1. An adhesive composition, comprising:
   95 to 5% by mass of a crystalline polyolefin, and
   5 to 95% by mass of an amorphous polyolefin;
   wherein the crystalline polyolefin satisfies the following conditions (a-1), (b1), and (b2):
   (a-1) the relationship between the limiting viscosity and the stereoregularity is represented by formula (i):

$$-20 \times \eta + 56 \leq \text{mmmm} \leq -20 \times \eta + 64 \qquad \text{formula (i)}$$

wherein η represents the limiting viscosity measured in tetralin at 135° C., and mmmm represents the meso pentad fraction in mol %;
   (b1) the meso pentad fraction (mmmm) is from 20 to 60 mol %; and
   (b2) the limiting viscosity [η] measured in tetralin at 135° C. is from 0.01 to 2.0 dL/g,
   wherein the amorphous polyolefin has a melting point which is lower than 20° C. or is not observed by a differential scanning calorimeter (DSC) and having a ΔH of less than 5 J/g, and
   wherein the storage elastic modulus of the adhesive composition at 25° C. obtained from a solid viscoelasticity measurement of the composition is 1 MPa or more and 200 MPa or less, and the storage elastic modulus of the adhesive composition at 50° C. is 1 MPa or more and 100 MPa or less.

2. The adhesive composition according to claim 1, wherein the crystalline polyolefin has a melting point of 20° C. or higher and 160° C. or lower, and a ΔH of 5 J/g or more and 100 J/g or less.

3. The adhesive composition according to claim 1, wherein the crystalline polyolefin is a propylene homopolymer.

4. The adhesive composition according to claim 1, further comprising a tackifier.

5. An adhesive tape, wherein the adhesive composition according to claim 1 is used in an adhesive layer.

6. An adhesive tape, wherein the adhesive composition according to claim 4 is used in an adhesive layer.

7. The adhesive composition according to claim 2, further comprising a tackifier.

8. The adhesive composition according to claim 3, further comprising a tackifier.

9. An adhesive tape, wherein the adhesive composition according to claim 7 is used in an adhesive layer.

10. An adhesive tape, wherein the adhesive composition according to claim 8 is used in an adhesive layer.

11. The adhesive composition according to claim 1, wherein the amorphous polyolefin satisfies the following (a1) to (a5):
    (a1) the meso pentad fraction (mmmm) is from 3 to 40 mol %, or the meso diad fraction (m) is from 30 to 95 mol %,
    (a2) a sum of a 1,3-bond fraction and a 1,4-bond fraction is less than 0.3 mol %,
    (a3) a 2,1-bond fraction is less than 0.3 mol %,
    (a4) the molecular weight distribution (Mw/Mn) as measured by gel permeation chromatography (GPC) is 4.0 or less; and
    (a5) the weight-average molecular weight (Mw) as measured by GPC is from 5,000 to 1,000,000.

* * * * *